(12) United States Patent  
Kim et al.

(10) Patent No.: US 8,623,473 B2
(45) Date of Patent: Jan. 7, 2014

(54) LIQUID CRYSTAL COMPOSITION AND LIQUID CRYSTAL DISPLAY INCLUDING THE SAME

(75) Inventors: Si-Heun Kim, Asan-si (KR); Seong-Nam Lee, Seoul (KR); Duck-Jong Suh, Seoul (KR); Ji-Eun Jang, Suwon-si (KR); Jae-Weon Hur, Busan (KR)

(73) Assignee: Samsung Display Co., Ltd., Yongin (KR)

( * ) Notice: Subject to any disclaimer, the term of this patent is extended or adjusted under 35 U.S.C. 154(b) by 121 days.

(21) Appl. No.: 13/237,783

(22) Filed: Sep. 20, 2011

(65) Prior Publication Data

US 2012/0262661 A1 Oct. 18, 2012

(30) Foreign Application Priority Data

Apr. 14, 2011 (KR) .......................... 10-2011-0034611

(51) Int. Cl.
  *C09K 19/44* (2006.01)
  *C09K 19/12* (2006.01)
  *C09K 19/34* (2006.01)
  *C09K 19/30* (2006.01)

(52) U.S. Cl.
  USPC .................. 428/1.1; 252/299.61; 252/299.63; 252/299.66

(58) Field of Classification Search
  USPC ............ 428/1.1; 252/299.61, 299.63, 299.66, 252/299.67
  See application file for complete search history.

(56) References Cited

U.S. PATENT DOCUMENTS

| | | | |
|---|---|---|---|
| 2008/0246001 A1* | 10/2008 | Hiroaki | 252/299.61 |
| 2010/0060843 A1* | 3/2010 | Saito et al. | 349/186 |
| 2010/0176341 A1* | 7/2010 | Tanaka et al. | 252/299.61 |
| 2010/0320420 A1* | 12/2010 | Hirschmann et al. | 252/299.61 |
| 2012/0161073 A1* | 6/2012 | Tanaka et al. | 252/299.62 |

* cited by examiner

*Primary Examiner* — Shean C Wu
(74) *Attorney, Agent, or Firm* — H.C. Park & Associates, PLC

(57) ABSTRACT

A liquid crystal composition according to an exemplary embodiment of the present invention includes a liquid crystal compound represented by a below chemical formula (I) at about 10 wt % to about 15 wt %; and (I)

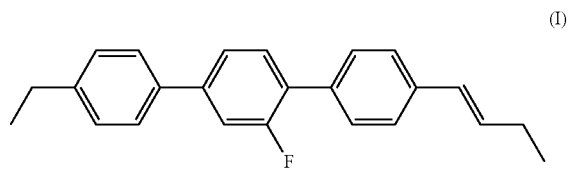

at least one liquid crystal compound at about 3 wt % to about 8 wt % among liquid crystal compounds represented by chemical formula (II) to chemical formula (IV).

(II)

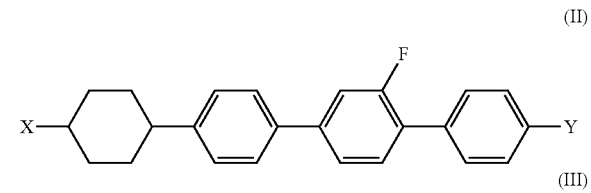

(III)

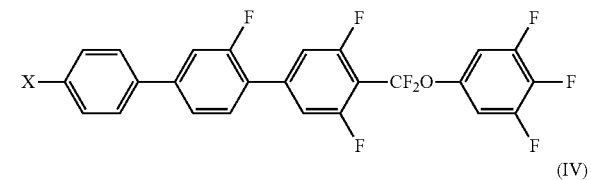

(IV)

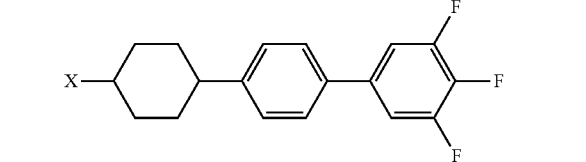

Here, X and Y may be equal to each other or different from each other, and each is an alkyl group or an alkenyl group having a carbon number of 1 to 4.

24 Claims, 8 Drawing Sheets

LIQUID CRYSTAL COMPOSITION AND LIQUID CRYSTAL DISPLAY INCLUDING THE SAME

CROSS REFERENCE TO RELATED APPLICATION

This application claims priority from and the benefit of Korean Patent Application No. 10-2011-0034611, filed on Apr. 14, 2011, which is hereby incorporated by reference for all purposes as if fully set forth herein.

BACKGROUND OF THE INVENTION

1. Field of the Invention

Exemplary embodiments of the present invention relate to a liquid crystal composition and a liquid crystal display including the same.

2. Discussion of the Background

A liquid crystal display (LCD) is one of the most widely used types of flat panel displays. A liquid crystal display includes two display panels on which field generating electrodes are formed, and a liquid crystal layer interposed between the panels. In the liquid crystal display, voltages are applied to the field generating electrodes so as to generate an electric field over the liquid crystal layer, and the alignment of liquid crystal molecules of the liquid crystal layer is determined by the electric field. Accordingly, the polarization of incident light is controlled, thereby performing image display.

An aspect of the liquid crystal display is a liquid crystal material that is suitable to control the transmittance of light and obtain desired images. Particularly, according to the various uses of the liquid crystal display, various characteristics such as low voltage driving, a high voltage holding ratio, a wide viewing angle characteristic, a wide range of operation temperature, and high speed response are required.

On the other hand, there is a trend for the transmittance of the twisted nematic (TN) mode liquid crystal display to be increased as retardation ($\Delta nd$) of the liquid crystal layer is increased, such that a cell gap of the liquid crystal display and a composition of the liquid crystal layer may be controlled to increase the $\Delta nd$.

It may be easier to increase the cell gap compared to changing the composition of the liquid crystal layer, however a process margin of the light blocking member may be decreased due to the increasing of the cell gap, the response speed may be increased, the contrast ratio may be reduced, and the usage amount of the liquid crystal may be increased.

The above information disclosed in this Background section is only for enhancement of understanding of the background of the invention and therefore it may contain information that does not form any part of the prior art nor what the prior art may suggest to a person of ordinary skill in the art.

SUMMARY OF THE INVENTION

Exemplary embodiments of the present invention provide a liquid crystal composition improving transmittance by increasing refractive anisotropy and a liquid crystal display including the same.

Additional features of the invention will be set forth in the description which follows, and in part will be apparent from the description, or may be learned by practice of the invention.

An exemplary embodiment of the present invention discloses a liquid crystal composition including: a liquid crystal compound represented by a below chemical formula (I) at about 10 wt % to about 15 wt %; and

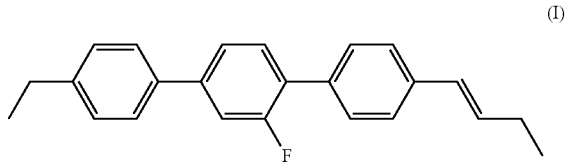 [SMILES: CC/C=C/c1ccc(-c2ccc(-c3ccc(CC)cc3)cc2F)cc1]

(I)

at least one liquid crystal compound at about 3 wt % to about 8 wt % of liquid crystal compounds represented by chemical formula (II), chemical formula (III) and chemical formula (IV):

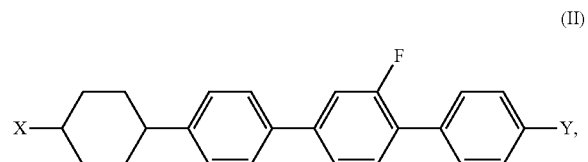

(II)

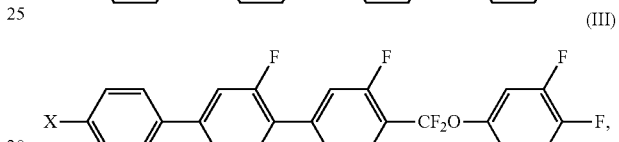

(III)

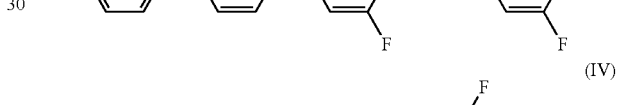

(IV)

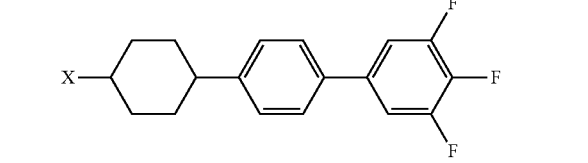

X and Y may be equal to each other or different from each other, and each is an alkyl group or an alkenyl group having a carbon number of 1 to 4.)

The amount of the liquid crystal compound represented by the chemical formula (II) is less than about 5 wt % of a total amount of the liquid crystal composition, the amount of the compound represented by the chemical formula (III) is in the range of about 4 wt % to about 7 wt % of the total amount of the liquid crystal composition, and the amount of the compound represented by the chemical formula (IV) is in the range of about 3 wt % to about 8 wt % of the total amount of the liquid crystal composition.

At least one among the liquid crystal compounds represented by a chemical formula (V) to a chemical formula (X) below may be further included.

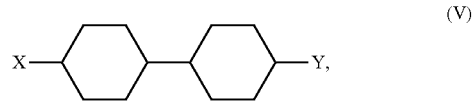

(V)

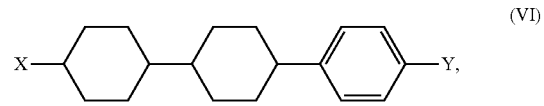

(VI)

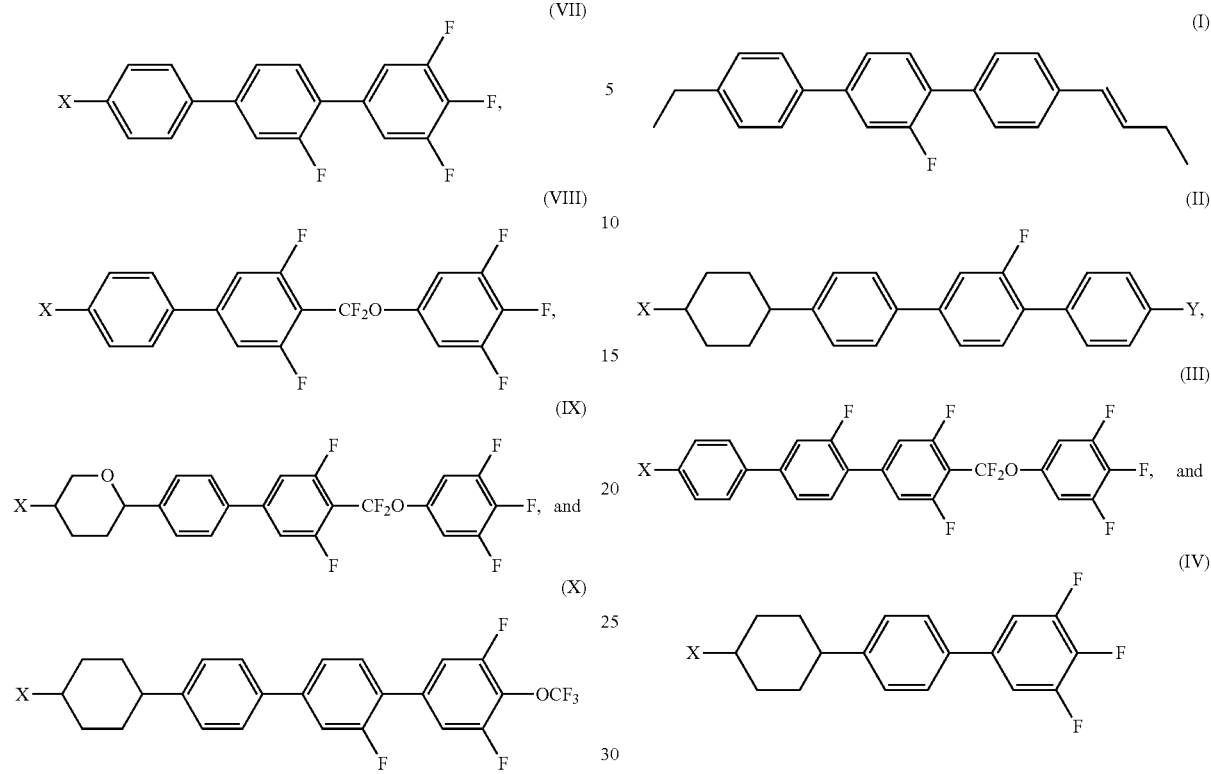

(here, X and Y may be equal to each other or different from each other, and each is an alkyl group or an alkenyl group having a carbon number of 1 to 4.)

The amount of the compound represented by the chemical formula (V) is in the range of about 32 wt % to about 43 wt % of the total amount of the liquid crystal composition, the compound represented by the chemical formula (VI) is in the range of about 2 wt % to about 13 wt % for the total amount of the liquid crystal composition, the amount of the compound represented by the chemical formula (VII) is in the range of about 8 wt % to about 15 wt % of the total amount of the liquid crystal composition, the amount of the compound represented by the chemical formula (VIII) is in the range of about 10 wt % to about 15 wt % of the total amount of the liquid crystal composition, the amount of the compound represented by the chemical formula (IX) is in the range of about 5 wt % to about 15 wt % of the total amount of the liquid crystal composition, and the amount of the compound represented by the chemical formula (X) is in the range of about 2 wt % to about 7 wt % of the total amount of the liquid crystal composition.

An exemplary embodiment of the present invention also discloses a liquid crystal display according to an exemplary embodiment of the present invention that includes: a first display panel; a second display panel facing the first display panel; and a liquid crystal layer disposed between the first display panel and the second display panel. The liquid crystal layer includes a liquid crystal composition, wherein the liquid crystal composition includes a liquid crystal compound represented by a below chemical formula (I) at about 10 wt % to about 15 wt %, and at least one liquid crystal compound at about 3 wt % to about 8 wt % of liquid crystal compounds represented by chemical formula (II), chemical formula (III) and chemical formula (IV):

X and Y may be equal to each other or different from each other, and each is an alkyl group or an alkenyl group having a carbon number of 1 to 4.)

The amount of the liquid crystal compound represented by the chemical formula (II) is less than about 5 wt % of a total amount of the liquid crystal composition, the amount of the compound represented by the chemical formula (III) is in the range of about 4 wt % to about 7 wt % of the total amount of the liquid crystal composition, and the amount of the compound represented by the chemical formula (IV) is in the range of about 3 wt % to about 8 wt % of the total amount of the liquid crystal composition.

At least one among the liquid crystal compound represented by a chemical formula (V) to a chemical formula (X) below may be further included:

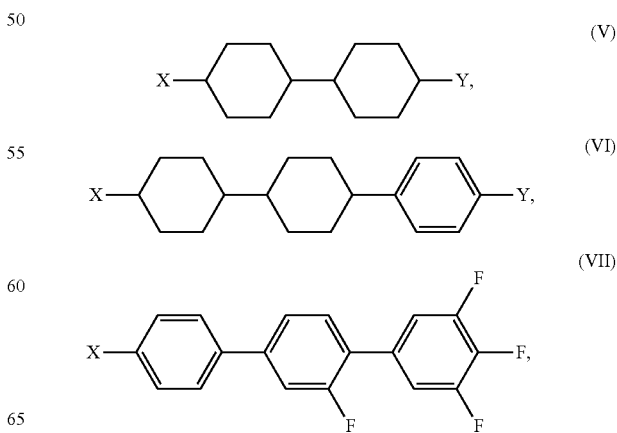

-continued (VIII)

[chemical structure]

(IX)

[chemical structure], and (X)

[chemical structure]

(here, X and Y may be equal to each other or different from each other, and each is an alkyl group or an alkenyl group having a carbon number of 1 to 4.)

The amount of the compound represented by the chemical formula (V) is in the range of about 32 wt % to about 43 wt % of the total amount of the liquid crystal composition, the amount of the compound represented by the chemical formula (VI) is in the range of about 2 wt % to about 13 wt % of the total amount of the liquid crystal composition, the amount of the compound represented by the chemical formula (VII) is in the range of about 8 wt % to about 15 wt % of the total amount of the liquid crystal composition, the amount of the compound represented by the chemical formula (VIII) is in the range of about 10 wt % to about 15 wt % of the total amount of the liquid crystal composition, the amount of the compound represented by the chemical formula (IX) is in the range of about 5 wt % to about 15 wt % of the total amount of the liquid crystal composition, and the amount of the compound represented by the chemical formula (X) is in the range of about 2 wt % to about 7 wt % of the total amount of the liquid crystal composition.

Retardation of the liquid crystal layer may be in the range of 450 nm to 460 nm.

Refractive anisotropy of the liquid crystal layer may be in the range of 0.135 to 0.145.

A liquid crystal pitch of the liquid crystal layer may be in the range of 50 μm-80 μm, dielectric anisotropy (Δ∈) may be in the range of 12 to 13, and rotational viscosity may be ≤85 mPa·s.

A cell gap between two display panels may be in the range of 3.1 μm to 3.3 μm.

An exemplary embodiment of the present invention also discloses a liquid crystal composition that includes a liquid crystal compound represented by a chemical formula (XI) at about 10 wt % to about 15 wt % below, and (XI)

[chemical structure]

at least one liquid crystal compound at about 2 wt % to about 20 wt % of liquid crystal compounds represented by chemical formula (II), chemical formula (XII), chemical formula (XIII) and chemical formula (XIV) below.

(II)

[chemical structure]

(XII)

[chemical structure]

(XIII)

[chemical structure], and (XIV)

[chemical structure]

X and Y may be equal to each other or different from each other, and each is an alkyl group or an alkenyl group having a carbon number of 1 to 4.)

The amount of the liquid crystal compound represented by the chemical formula (II) is in the range of about 2 wt % to about 5 wt % of the total amount of the liquid crystal composition, The amount of the liquid crystal compound represented by the chemical formula (XII) is in the range of about 9 wt % to about 10 wt % of the total amount of the liquid crystal composition, the amount of the liquid crystal compound represented by the chemical formula (XIII) is in the range of about 1 wt % to about 5 wt % of the total amount of the liquid crystal composition, and the amount of the liquid crystal compound represented by the chemical formula (XIV) is in the range of about 17 wt % to about 20 wt % of the total amount of the liquid crystal composition.

At least one among the liquid crystal compound represented by a chemical formula (V) and a chemical formula (VIII) below may be further included:

(V)

[chemical structure] and (VIII)

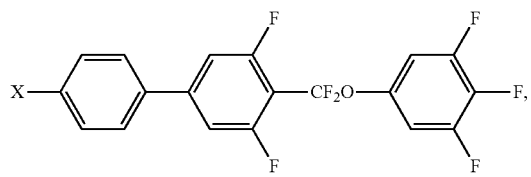

(here, X and Y may be equal to each other or different from each other, and each is an alkyl group or an alkenyl group having a carbon number of 1 to 4.)

The amount of the liquid crystal compound represented by the chemical formula (V) is in the range of about 32 wt % to about 43 wt % of the total amount of the liquid crystal composition, and the amount of the liquid crystal compound represented by the chemical formula (VIII) is in the range of about 15 wt % to about 20 wt % of the total amount of the liquid crystal composition.

An exemplary embodiment of the present invention also discloses a liquid crystal display that includes: a first display panel; a second display panel facing the first display panel; and a liquid crystal layer disposed between the first display panel and the second display panel. The liquid crystal layer includes a liquid crystal compound represented by a chemical formula (XI) at about 10 wt % to about 15 wt % below; and (XI)

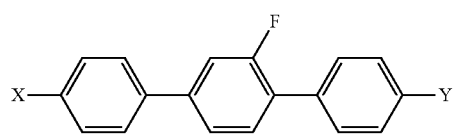

at least one liquid crystal compound at about 2 wt % to about 20 wt % of liquid crystal compounds represented by chemical formula (II), chemical formula (XII), chemical formula (XIII) and chemical formula (XIV) below.

(II)

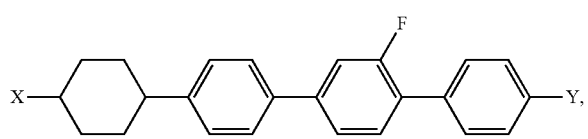

(XII)

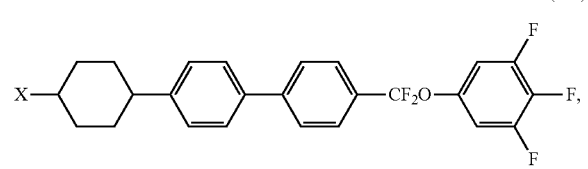

(XIII)

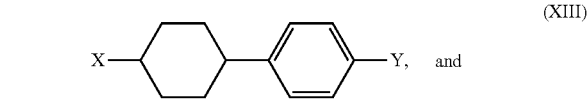

(XIV)

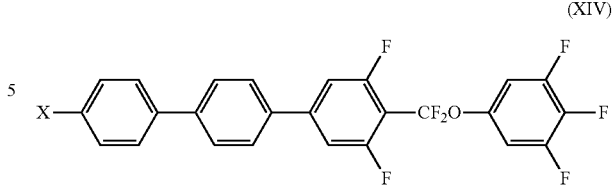

X and Y may be equal to each other or different from each other, and each is an alkyl group or an alkenyl group having a carbon number of 1 to 4.)

The amount of the liquid crystal compound represented by the chemical formula (II) is in the range of about 2 wt % to about 5 wt % of the total amount of the liquid crystal composition, the amount of the liquid crystal compound represented by the chemical formula (XII) is in the range of about 9 wt % to about 10 wt % of the total amount of the liquid crystal composition, the amount of the liquid crystal compound represented by the chemical formula (XIII) is in the range of about 1 wt % to about 5 wt % of the total amount of the liquid crystal composition, and the amount of the liquid crystal compound represented by the chemical formula (XIV) is in the range of about 17 wt % to about 20 wt % of the total amount of the liquid crystal composition.

At least one among the liquid crystal compound represented by a chemical formula (V) and a chemical formula (VIII) below may be further included:

(V)

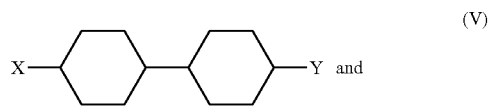

(VIII)

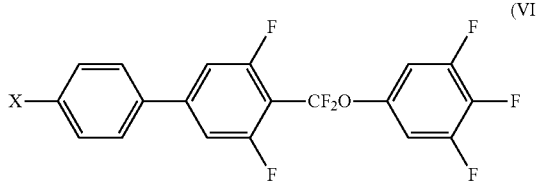

(here, X and Y may be equal to each other or different from each other, and each is an alkyl group or an alkenyl group having a carbon number of 1 to 4.)

The amount of the liquid crystal compound represented by the chemical formula (V) is in the range of about 32 wt % to about 43 wt % of the total amount of the liquid crystal composition, and the amount of the liquid crystal compound represented by the chemical formula (VIII) is in the range of about 15 wt % to about 20 wt % of the total amount of the liquid crystal composition.

Retardation of the liquid crystal layer may be in the range of 450 nm to 460 nm.

Refractive anisotropy of the liquid crystal layer may be in the range of 0.135 to 0.145.

A liquid crystal pitch of the liquid crystal layer may be in the range of 50 μm-80 μm, dielectric anisotropy ($\Delta\epsilon$) may be in the range of 12 to 13, and rotational viscosity may be ≤85 mPa·s.

A cell gap between the two display panels may be in the range of 3.1 μm to 3.3 μm.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DETAILED DESCRIPTION OF THE ILLUSTRATED EMBODIMENTS

Figure 1:
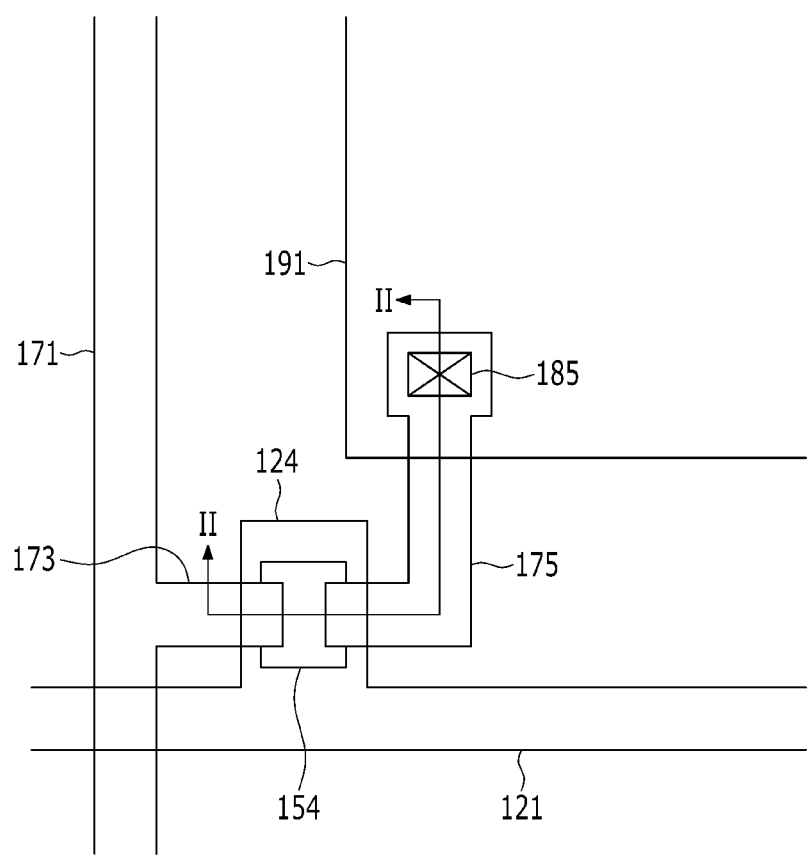
FIG. 1 is a layout view of a liquid crystal display according to an exemplary embodiment of the present invention.

The present invention will be described more fully hereinafter with reference to the accompanying drawings, in which exemplary embodiments of the invention are shown. As those skilled in the art would realize, the described embodiments may be modified in various different ways, all without departing from the spirit or scope of the present invention.

In the drawings, the thickness of layers, films, panels, regions, etc., are exaggerated for clarity. Like reference numerals designate like elements throughout the specification. It will be understood that when an element such as a layer, film, region, or substrate is referred to as being "on" or "connected to" another element, it can be directly on or directly connected to the other element or intervening elements may also be present. In contrast, when an element is referred to as being "directly on" or "directly connected to" another element, there are no intervening elements present. It will be understood that for the purposes of this disclosure, "at least one of X, Y, and Z" can be construed as X only, Y only, Z only, or any combination of two or more items X, Y, and Z (e.g., XYZ, XYY, YZ, ZZ).

A liquid crystal composition according to an exemplary embodiment of the present invention includes various liquid crystal compounds having different physical characteristics.

The liquid crystal includes a core group forming a center axis, and a terminal group and/or a lateral group connected thereto.

The core group may include a cyclic compound selected from a phenyl group, a cyclohexyl group, and heterocycles.

The terminal group and/or the lateral group may include a non-polar group such as an alkyl group, an alkoxy group, an alkenyl group, or a polar group including fluorine atoms, and a physical characteristic is changed according to the terminal group or the lateral group.

A liquid crystal composition according to an exemplary embodiment of the present invention includes a liquid crystal compound represented by a chemical formula (I) below.

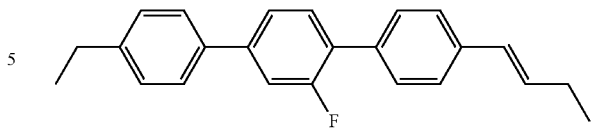

(I)

The liquid crystal compound represented by the chemical formula (I) has a high refractive anisotropy (Δn) such that it contributes to improve the transmittance, and the rotational viscosity (r1) is low such that it contributes to increase the response speed of the liquid crystal.

The liquid crystal compound represented by the chemical formula (I) may be included in the range of about 10 wt % to about 15 wt % of a total amount of the liquid crystal composition.

If the liquid crystal compound represented by chemical formula (I) is less than about 10 wt %, the rotational viscosity of the liquid crystal is over about 85 mPa·s such that it is difficult to obtain a general response speed of the liquid crystal of 8 ms, and if it is over about 15 wt %, the phase transition temperature (Tni) of the liquid crystal is 78° C. such that it is difficult to obtain high temperature reliability.

Also, to compensate for the low temperature reliability of the liquid crystal compound represented by the chemical formula (I), a liquid crystal compound represented by a chemical formula (II) may be further included.

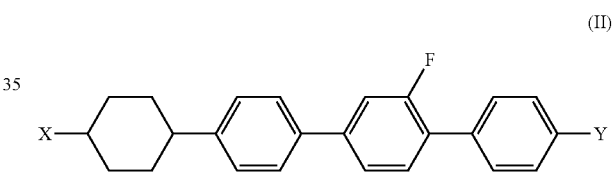

(II)

Here, X and Y may be equal to each other or different from each other, and each is an alkyl group or alkenyl group having a carbon number of 1 to 4.

Like the compound represented by the chemical formula (I), the liquid crystal compound represented by chemical formula (II) has a high Δn such that it contributes to improve the transmittance, and the low temperature reliability may be improved at a temperature of less than −25° C. However, the rotational viscosity is high such that the response speed of the liquid crystal may be decreased, and accordingly the liquid crystal compound represented by the chemical formula (II) may be mixed at less than about 5 wt %.

A liquid crystal compound represented by a chemical formula (III) representing a polar compound may be further included along with the above compound represented by the chemical formula (I) and (II).

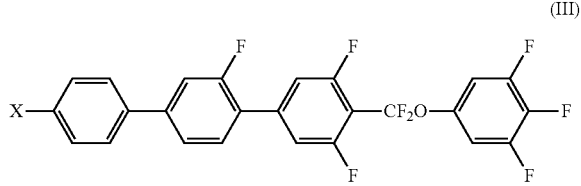

(III)

Here, X and Y may be equal to each other or different from each other, and each is an alkyl group or alkenyl group having a carbon number of 1 to 4.

The liquid crystal compound represented by the chemical formula (III) may be included in the range of about 4 wt % to about 7 wt %.

If the amount of liquid crystal compound represented by chemical formula (III) is less than about 4 wt %, the dielectric anisotropy is less than 12 such that the desired contrast ratio of 800-1000 may not be obtained in the region of 3.5V. If the amount of liquid crystal compound represented by chemical formula (III) is more than about 7 wt %, the rotational viscosity of the liquid crystal is more than 85 mPa·s such that the general response speed of the liquid crystal of 8 ms may not be obtained.

On the other hand, in the liquid crystal composition according to the present exemplary embodiment, the compound represented by the chemical formula (I) and the chemical formula (II) are neutral compounds that do not have a polarity, and the compound represented by the chemical formula (III) is a polar compound having a polarity.

When mixing the compound represented by the chemical formula (I), the chemical formula (II) and the chemical formula (III), solubility may be decreased such that a compound represented by a chemical formula (IV) may be further included to improve the solubility.

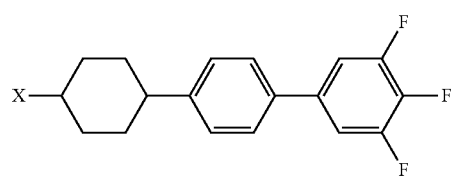

(IV)

Here, X and Y may be equal to each other or different from each other, and each is an alkyl group or an alkenyl group having a carbon number of 1 to 4.

The compound represented by the chemical formula (IV) is added to increase the solubility, however the rotational viscosity may be increased such that the compound represented by the chemical formula (IV) may be included in the range of about 3 wt % to about 8 wt %.

The liquid crystal compound according to an exemplary embodiment of the present invention may further include a neutral compound and a polar compound as well as the liquid crystal compounds represented by chemical formula (I), (II), (III) and (IV).

The neutral compound may further include at least one of the liquid crystal compounds represented by a chemical formula (V)

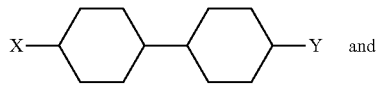

(V)

and chemical formula (VI)

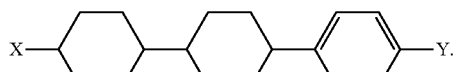

(VI)

Here, X and Y may be equal to each other or different from each other, and each is an alkyl group or an alkenyl group having a carbon number of 1 to 4. The liquid crystal compound represented by the chemical formula (V) may be included in the range of about 32 wt % to about 43 wt % of the total amount of the liquid crystal composition, and the compound represented by the chemical formula (VI) may be included in the range of about 2 wt % to about 13 wt % of the total amount of the liquid crystal composition.

If the amount of the compound represented by chemical formula (V) is less than about 32 wt %, or if the compound represented by the chemical formula (VI) is less than about 2 wt %, the rotational viscosity of the liquid crystal is more than 85 mPa·s such that the response speed of 8 ms may not be obtained. If the amount of the compound represented by the chemical formula (V) is over about 43 wt % or the amount of the compound represented by the chemical formula (VI) is over about 13 wt %, the low temperature reliability at less than −25° C. and the high temperature reliability at more than 78° C. may not be obtained.

The polar compound may include at least one of the liquid crystal compounds represented by a chemical formula (VII)

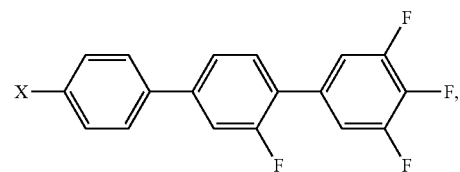

(VII)

chemical formula (VIII)

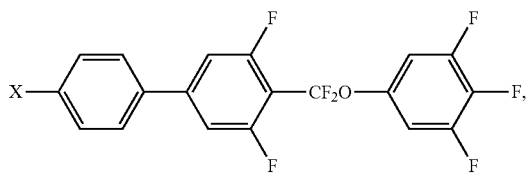

(VIII)

chemical formula (IX)

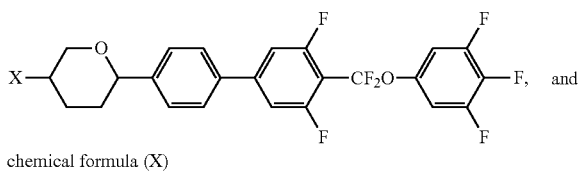

(IX)

and chemical formula (X)

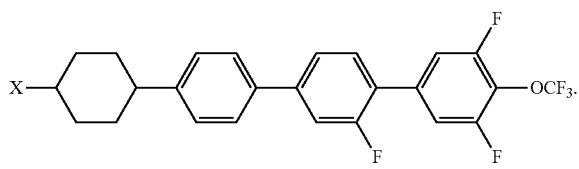

(X)

Here, X and Y may be equal to each other or different from each other, and each is an alkyl group or an alkenyl group having a carbon number of 1 to 4.

The polar compound may include the at least one compound represented by the chemical formulae (VII), (VIII), (IX), and (X) of about 8 wt % to about 15 wt %, about 5 wt % to about 15 wt %, about 4 wt % to about 7 wt %, and about 2 wt % to about 7 wt %, respectively, of the total amount of the liquid crystal composition.

If the compounds represented by the chemical formulae (VII), (VIII), (IX), and (X) are respectively added at less than the minimum values, the dielectric anisotropy is less than 12 such that the desired contrast ratio of 800-1000 may not be obtained in the range of 3.5V, and if they are added at over the maximum value, the rotational viscosity of the liquid crystal is more than 85 mPa·s such that the general response speed of the liquid crystal of 8 ms may not be obtained.

Table 1, shows a characteristic by using a liquid crystal compound including each threshold value of the compound represented by the chemical formulae (I) to (X).

TABLE 1

| Chemical formula | Example 1 | Example 2 | Example 3 | Example 4 |
|---|---|---|---|---|
| | Weight % | | | |
| Chemical formula I | 12 | 21 | 10 | 5 |
| Chemical formula II | 5 | 0 | 0 | 0 |
| Chemical formula III | 6 | 9 | 0 | 4 |
| Chemical formula IV | 8 | 0 | 13 | 3.5 |
| Chemical formula V | 31.5 | 49.5 | 34 | 31.5 |
| Chemical formula VI | 2.5 | 0 | 9 | 7 |
| Chemical formula VII | 11 | 9 | 13 | 8 |
| Chemical formula VIII | 15 | 0 | 5 | 14 |
| Chemical formula IX | 5 | 0 | 7 | 17 |
| Chemical formula X | 3.5 | 5 | 0 | 5 |
| Chemical formula XI | 0 | 6.5 | 0 | 0 |
| Chemical formula XII | 0 | 0 | 2 | 5 |
| Chemical formula XIII | 0 | 0 | 3 | 0 |
| Chemical formula XIV | 0 | 0 | 4 | 0 |
| Result | RT = 8.5 ms to 9 ms | Smecticity generation | CR + 500~600 | RT = 12 ms to 13 ms |

Referring to Table 1, as shown in the first experimental example, when including the compound represented by the chemical formula (V) of 31.5 wt %, the response speed is 8.5 ms to 9 ms, and thereby it may be confirmed that the response speed is increased rather than being 8 ms.

Also, when the compounds represented by the chemical formulae (V), (I), (III), and (X) are respectively included in the range of 49.5 wt %, 21 wt %, 9 wt %, and 5 wt % as shown in the second experimental example, a smectic liquid crystal is generated at a low temperature of less than −25° C.

Also, when the compound represented by the chemical formulae (IV) and (VIII) are respectively included in the range of 13 wt % and 5 wt % as shown in the third experimental example, it may be confirmed that the contrast ratio is 500 to 600 less than the required 800.

Also, when the compound represented by the chemical formulae (V), (I), and (IX) are respectively included in the range of 31.5 wt %, 5 wt %, and 17 wt % as shown in the fourth experimental example, it may be confirmed that the response speed is 12 ms to 13 ms that does not reach the required response speed.

Compounds represented by chemical formulae (XXI) to (XXIV) below may be further included to improve Tni, Δn, and the solubility as well as the compound represented by the chemical formulae (I) to (X).

chemical formula (XXI)

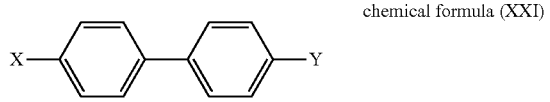

chemical formula (XXII)

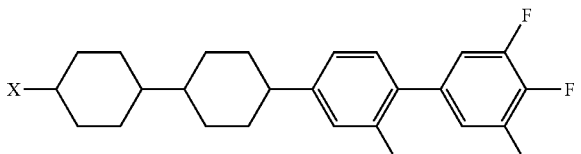

chemical formula (XXIII)

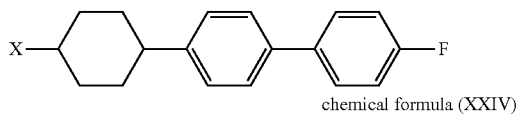

chemical formula (XXIV)

The compound represented by the chemical formula (XXI) controls the characteristic of Tni and Δn, the compounds represented by the chemical formula (XXII) and the chemical formula (XXIII) control the solubility characteristic, and the compound represented by the chemical formula (XXIV) controls the characteristic of Δn.

As the above-described experimental examples of Table 1 show, when the chemical formulae (I) to (X) are out of at least one of the above-described ranges, the response speed may be slow, the contrast ratio may be low, or the liquid crystal characteristic may be changed. Accordingly, as described above, the liquid crystal material that is combined within the range of the exemplary embodiment of the present invention is used.

Next, a liquid crystal composition according to another exemplary embodiment including a liquid crystal compound of a different kind from the above-described liquid crystal composition will be described.

A liquid crystal composition according to this exemplary embodiment of the present invention includes a liquid crystal compound represented by chemical formula (XI)

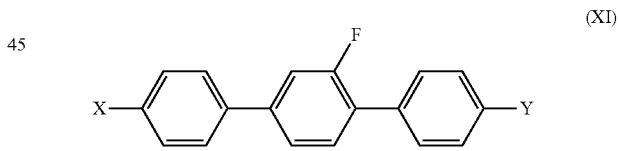

(XI)

The Δn value of the liquid crystal compound represented by chemical formula (XI) is high such that it contributes to improve the transmittance, and the rotational viscosity r1 is low such that it contributes to increase the response speed of the liquid crystal. If the amount of the liquid crystal compound of the chemical formula (XI) is less than about 10 wt % of the total amount of the liquid crystal composition, the rotational viscosity of the liquid crystal is more than 85 mPa·s such that it is difficult to obtain the general response speed of the liquid crystal of 8 ms, and if it is over about 15 wt %, the phase transition temperature Tni of the liquid crystal is 78° C. such that it is difficult to obtain the high temperature reliability.

Accordingly, the liquid crystal compound represented by the chemical formula (XI) may be included in the range of about 10 wt % to about 15 wt % of the total amount of the liquid crystal composition.

Also, the Δn of the liquid crystal compound represented by the chemical formula (II) is high such that the liquid crystal compound represented by the chemical formula (II) is used to further improve the transmittance.

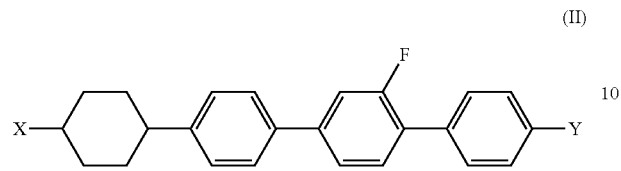

(II)

However, if the amount of the liquid crystal compound represented by the chemical formula (II) is over about 5 wt % of the total amount of the liquid crystal composition, the rotational viscosity r1 is more than 78 mPa·s such that it is difficult to obtain the general response speed of the liquid crystal of 8 ms, and if the amount of the liquid crystal compound represented by the chemical formula (II) is less than about 2 wt %, it is difficult to obtain the low temperature reliability and the high temperature reliability.

Accordingly, the liquid crystal compound represented by the chemical formula (II) may be included in the range of about 2 wt % to about 5 wt % of the total amount of the liquid crystal composition.

Also, to compensate for the low temperature reliability of the liquid crystal compound represented by the chemical formulae (XI) and (II), a liquid crystal compound represented by a chemical formula (XII) may be included.

A liquid crystal compound represented by the chemical formula (XII) representing a polar compound having polarity may be further included along with the compound represented by chemical formula (XI) and chemical formula (II).

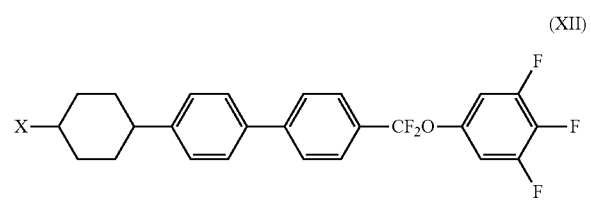

(XII)

If the liquid crystal compound represented by chemical formula (XII) is included at less than about 9 wt % of the total amount of the liquid crystal composition, the dielectric anisotropy of the liquid crystal is less than 12.7 such that the required contrast ratio of 800-1000 may not be obtained in the range of 3.5V, and if it is over about 10 wt %, the rotational viscosity of the liquid crystal is more than 78 mPa·s such that the general response speed of the liquid crystal of 8 ms may not be obtained.

Accordingly, the liquid crystal compound represented by the chemical formula (XII) may be included in the range of about 9 wt % to about 10 wt % of the total amount of the liquid crystal composition.

On the other hand, in the liquid crystal composition according to the present exemplary embodiment, the compound represented by the chemical formula (XI) and the chemical formula (II) are neutral compounds not having polarity, and the compound represented by the chemical formula (XII) is a polar compound having polarity.

When mixing the compounds represented by the chemical formula (XI), the chemical formula (II) and the chemical formula (XII), insolubility (a solubility characteristic deterioration) may be generated between the neutral compounds and the polar compound such that the compound represented by chemical formula (XIII) to improve solubility may be further included.

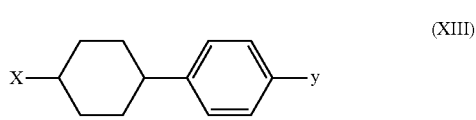

(XIII)

The compound represented by the chemical formula (XIII) may allow the solubility and the low temperature characteristic to be improved, however the rotational viscosity may be increased such that the compound represented by the chemical formula (XIII) may be included in the range of about 1 wt % to about 5 wt % of the total amount of the liquid crystal composition.

The liquid crystal compound according to an exemplary embodiment of the present invention may further include the neutral compounds and the polar compounds as well as the liquid crystal compounds represented by the chemical formulae (XI), (II), (XII), and (XIII).

The polar compounds may further include the above-described chemical formula (VIII) as well as the liquid crystal compound represented by a chemical formula (XIV) below.

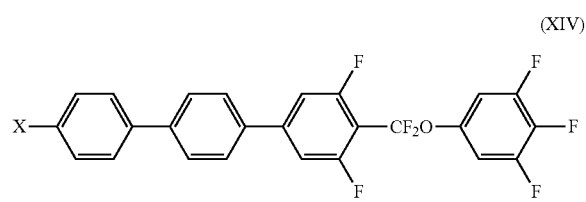

(XIV)

The compound represented by the chemical formula (XIV) may be included in the range of about 17 wt % to about 20 wt % of the total amount of the liquid crystal composition, and the compound represented by the chemical formula (VIII) may be included in the range of about 15 wt % to about 20 wt % of the total amount of the liquid crystal composition.

If the amount of the compound represented by the chemical formula (XIV) is less than about 17 wt %, the dielectric anisotropy of the liquid crystal is less than about 12.7 such that the required contrast ratio may not be obtained in the range of 3.5V. Also, when it is over 29 wt %, the rotational viscosity of the liquid crystal is more than 78 mPa·s such that the general response speed of the liquid crystal of 8 ms may not be obtained. Also, there is a problem that the low temperature reliability at less than −25° C. is decreased.

If the amount of the compound represented by the chemical formula (VIII) is less than about 15 wt %, the dielectric anisotropy is less than 12.7 such that the contrast ratio of 800-1000 may not be obtained in the range of 3.5V, and if it is over about 20 wt %, the rotational viscosity of the liquid crystal is more than 75 mPa·s such that the general response speed of the liquid crystal of 8 ms may not be obtained.

Also, the neutral compound may further include the compound represented by the above-described chemical formula (V) at about 32 wt % to about 43 wt % of the total amount of the liquid crystal composition.

If the amount of the compound represented by the chemical formula (V) is less than about 32 wt %, the rotational viscosity of the liquid crystal is more than 85 mPa·s such that the response speed of 8 ms may not be obtained. If the amount of the compound represented by the chemical formula (V) is over about 43 wt %, the low temperature reliability at less than −25° C. and the high temperature reliability at more than 78° C. may not be obtained.

As described above, when forming the liquid crystal composition by including the compounds represented by the chemical formula (XI) to chemical formula (XIV) and the compounds represented by the chemical formula (II), the chemical formula (V), and the chemical formula (VIII) included in the above-described liquid crystal composition, the liquid crystal characteristic being the same as the liquid crystal composition including the chemical formulae (I) to (X) may be obtained.

Next, a liquid crystal display including the above-described liquid crystal composition will be described with reference to accompanying drawings.

As those skilled in the art would realize, the described embodiments may be modified in various different ways, all without departing from the spirit or scope of the present invention.

Figure 2:
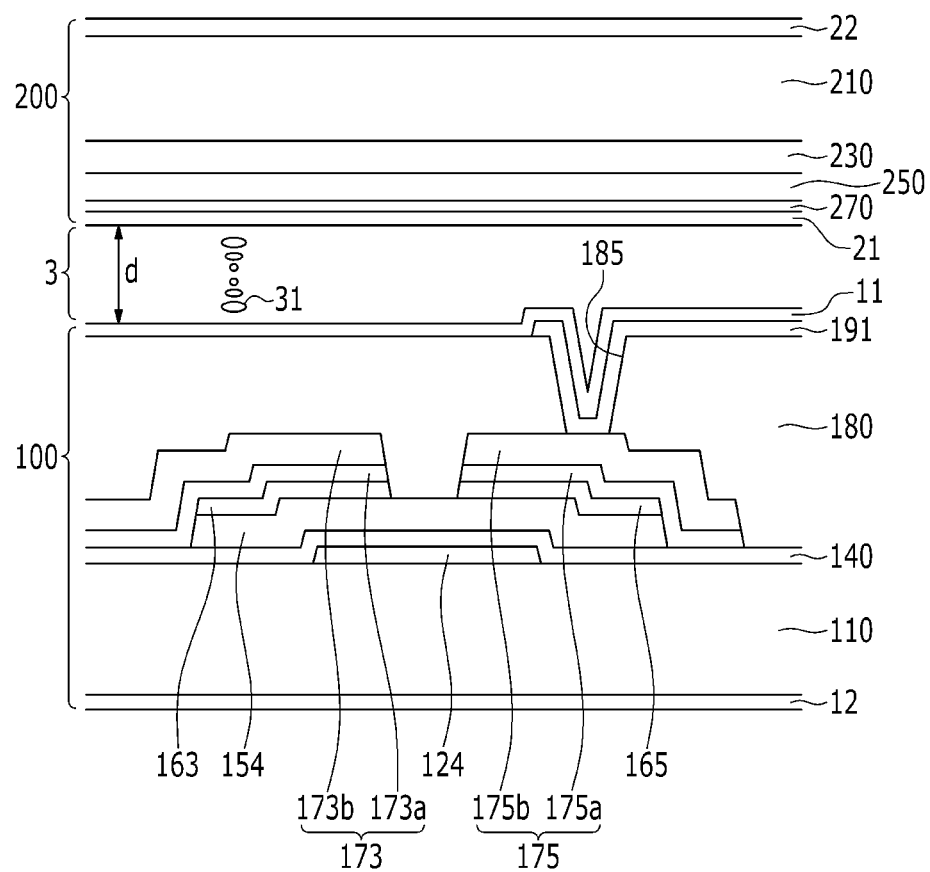
FIG. 2 is a cross-sectional view taken along line II-II of FIG. 1.
Figure 3:
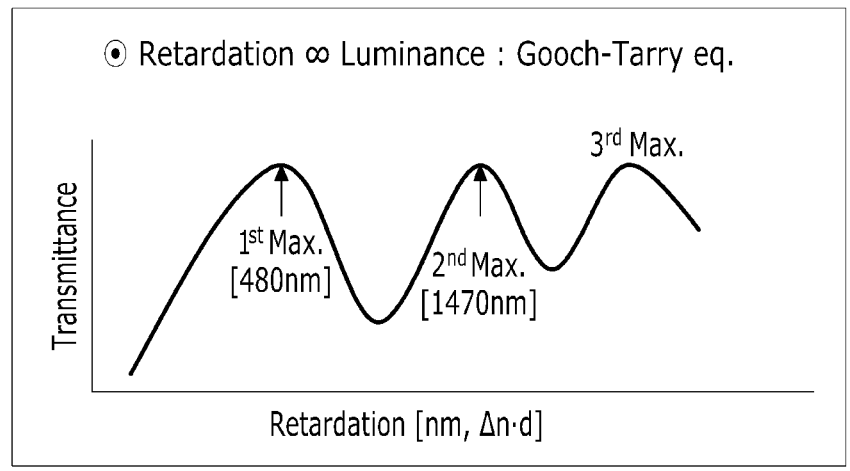
FIG. 3 is a graph of retardation and transmittance according to the Gooch-Tarry equation.

FIG. 1 is a layout view of a liquid crystal display according to an exemplary embodiment of the present invention, FIG. 2 is a cross-sectional view taken along line II-II of FIG. 1, and FIG. 3 is a graph of retardation and transmittance according to the Gooch-Tarry equation.

Referring to FIG. 1 and FIG. 2, a liquid crystal display according to an exemplary embodiment of the present invention includes a thin film transistor array panel 100 and a common electrode panel 200 facing each other, and a liquid crystal layer 3 interposed between the two display panels 100 and 200.

Firstly, the thin film transistor array panel 100 will be described.

A plurality of gate lines 121 are formed on an insulating substrate 110 that may be made of transparent glass or plastic.

The gate lines 121 extend substantially in a transverse direction and transmit gate signals. Each of gate lines 121 includes a plurality of gate electrodes 124 protruding upward, and an end portion (not shown) for connection with another layer or an external driving circuit.

The gate lines 121 may be made of a conductor having low resistivity such as an aluminum (Al)-based metal, silver (Ag)-based metal, a copper (Cu)-based metal, a molybdenum (Mo)-based metal, chromium (Cr)-based metal, tantalum (Ta)-based metal, titanium (Ti)-based metal, and the like. However, they may have a multi-film structure including two conductive layers (not shown) having different physical properties.

A gate insulating layer 140 formed of silicon nitride (SiNx) or silicon oxide (SiOx) is formed on the gate lines 121.

A plurality of semiconductors 154 made of hydrogenated amorphous silicon (amorphous silicon is commonly abbreviated to "a-Si"), polysilicon, or the like are formed on the gate insulating layer 140.

A plurality of ohmic contact stripes and islands 163 and 165 are formed on the semiconductor 154. The ohmic contacts 163 and 165 may be formed using a material such as n+ hydrogenated amorphous silicon into which an n-type impurity is doped at a high concentration, or silicide. The ohmic contacts 163 and 165 are disposed in a pair on the semiconductor 154.

A plurality of data lines 171 and a plurality of drain electrodes 175 are formed on the ohmic contacts 163 and 165 and the gate insulating layer 140.

The data lines 171 transfer data signals and extend mainly in the longitudinal direction to cross the gate lines 121. Each of the data lines 171 includes a plurality of source electrodes 173 protruding toward the gate electrode 124, and an end portion (not shown) having an area for connection with another layer or an external driving circuit (not shown).

The drain electrodes 175 are spaced apart from the data lines 171 and each drain electrode 175 faces a corresponding one of the source electrodes 173 with respect to a corresponding one of the gate electrodes 124.

One gate electrode 124, one source electrode 173, and one drain electrode 175 constitute a thin film transistor (TFT) together with the semiconductor 154, and a channel of the TFT is formed at the projection between the source electrode 173 and the drain electrode 175 in the semiconductor 154.

Like the gate line 121, the data line 171 and the drain electrode 175 may be made of a conductor having low resistivity, and may be made of lower layers 173a and 175a of titanium and upper layers 173b and 175b of copper.

The ohmic contacts 163 and 165 are interposed only between the underlying semiconductors 154 and the overlying data lines 171 and drain electrodes 175 thereon, and reduce contact resistance therebetween.

A passivation layer 180 is formed on the data line 171, the drain electrode 175, and the exposed semiconductor 154.

A plurality of pixel electrodes 191 are formed on the passivation layer 180.

The pixel electrodes 191 may be made of a transparent conductive material such as ITO or IZO, or a reflective metal such as aluminum, silver, chromium, or alloys thereof.

The pixel electrodes 191 are physically and electrically connected to the drain electrodes 175 through contact holes 185, and receive the data voltages from the drain electrodes 175. The pixel electrodes 191 applied with the data voltage generate an electric field together with a common electrode 270 of the upper panel 200 that receives the common voltage, to thereby determine a direction of liquid crystal molecules 31 of the liquid crystal layer 3 between the two electrodes 191 and 270. Polarization of light that transmits through the liquid crystal layer 3 differs depending on the thusly-determined direction of the liquid crystal molecules.

The pixel electrode 191 and the common electrode 270 form a liquid crystal capacitor to maintain the applied voltage even after the TFT is turned off.

The pixel electrode 191 overlaps the storage electrode line (not shown) as well as the storage electrode thereby forming a storage capacitor such that the voltage storage capacity of the liquid crystal capacitor is reinforced.

Next, the common electrode panel 200 will be described.

A light blocking member (not shown) is formed on an insulation substrate 210 made of transparent glass or plastic. The light blocking member is referred to as a black matrix and prevents light leakage between the pixel electrodes 191. The light blocking member may include a portion corresponding to the gate line 121 and the data line 171 and a portion corresponding to the thin film transistor.

A plurality of color filters 230 are formed on the substrate 210. The color filters 230 are mostly located in a region surrounded by the light blocking members, and may extend in the longitudinal direction according to the columns of the pixel electrodes 191. Each color filter 230 may represent one of primary colors such as three primary colors of red, green, and blue. Differently from this, the color filters 230 may be formed in the thin film transistor array panel 100.

The color filter 230 may include a pigment and a dye, the pigment particles have a size of less than 50 nm, and the dye particles have a size (Å) of a molecular degree that may be directly dissolved to a solvent. The color filter including the minute pigments reduces the light loss due to scattering such that the transmittance is increased by 2% to 3% compared with a case that the minute pigment is not used.

An overcoat 250 is formed on the color filter 230 and the light blocking member. The overcoat 250 may be made of an (organic) insulating member, prevents the color filters 230 from being exposed to the outside, and provides a flat surface. The overcoat 250 may be omitted.

The common electrode 270 is formed on the overcoat 250. The common electrode 270 is made of a transparent conductor such as ITO or IZO.

Alignment layers 11 and 21 made of an insulating material such as a polyimide are coated on the inner surfaces of the display panels 100 and 200, and they may be horizontal alignment layers.

Polarizer 12 is attached on the outer surface of the thin film transistor array panel 100 and polarizer 22 is attached on the outer surface of the common electrode panel 200, and the transmissive axes of the two polarizers 12 and 22 may be perpendicular or parallel to each other. In the case of a reflective LCD, one of the two polarizers 12 and 22 can be omitted.

The polarizer may use a T-pol, and the T-pol may have transmittance of more than 43.75% such that the transmittance of the liquid crystal display may be increased by a degree of about 3% to 4%.

The display panels 100 and 200 are fixed by a sealant (not shown), and the liquid crystal layer 3 including a plurality of liquid crystal molecules 31 is formed in a region defined by the sealant.

The liquid crystal layer 3 has positive dielectric anisotropy, and the liquid crystal molecules 31 of the liquid crystal layer 3 are arranged such that a longitudinal axis of the liquid crystal molecules 31 is approximately parallel to the surfaces of the two display panels 100 and 200 in the case that an electric field does not exist and is twisted from the lower panel 100 to the upper panel 200.

The liquid crystal layer 3 may be made of the liquid crystal compositions including the above-described compounds, for example, the liquid crystal layer 3 may be made of the liquid crystal composition including the above-described compounds represented by the chemical formula (I), the chemical formula (II), the chemical formula (III), and the chemical formula (IV) at about 10 wt % to about 15 wt %, less than about 5 wt %, about 4 wt % to about 7 wt %, and about 3 wt % to about 8 wt %, respectively, of the total amount of the liquid crystal composition. Also, the compounds represented by the above chemical formula (V), the chemical formula (VI), the chemical formula (VII), the chemical formula (VIII), and the chemical formula (X) at about 32 wt % to about 43 wt %, about 2 wt % to about 13 wt %, about 8 wt % to about 15 wt %, about 5 wt % to about 15 wt %, about 4 wt % to about 7 wt %, and about 2 wt % to about 7 wt % respectively, of the total amount of the liquid crystal composition may be further included.

When the liquid crystal layer 3 is formed with a liquid crystal composition according to an exemplary embodiment of the present invention, the refractive anisotropy ($\Delta n$) is changed to 0.135 to 0.145 compared with the conventional 0.1286. If the refractive anisotropy is increased, the retardation ($\Delta nd$) is increased under an equal cell gap d.

The retardation of the liquid crystal composition of the TN mode is determined according to a Gooch-Tarry equation shown in FIG. 3, and a peak of the transmittance is increased according to the retardation.

For example, when the liquid crystal cell gap d is 3.2 μm, the retardation is located in the graph going to the first peak in the graph of FIG. 3. Here, when the conventional refractive anisotropy is 0.1286, the retardation is 410 nm, however when the refractive anisotropy is 0.145 like an exemplary embodiment of the present invention, the retardation is 450 nm such that it may be confirmed that the transmittance is increased, referring to the graph of FIG. 3.

When using the conventional liquid crystal composition, the retardation is 412 nm and the transmittance, referring to FIG. 3, is about 6.73%. However, when using the liquid crystal composition like an exemplary embodiment of the present invention, $\Delta n$ is increased such that the retardation is increased to 450 nm to 460 nm. Accordingly, referring to FIG. 3, it may be confirmed that the transmittance is increased by about 7.01%.

Here, the liquid crystal pitch of the liquid crystal layer 3 may be about 50 μm-80 μm, the dielectric anisotropy ($\Delta \in$) may be about 12 to 13, and the rotational viscosity may be less than about 85 mPa·s.

Meanwhile, when forming the liquid crystal layer made of the liquid crystal composition according to an exemplary embodiment of the present invention, the transmittance is increased, however the color coordinate of the liquid crystal display is changed to $\Delta(x, y) = (-5/1000, -5/1000)$ such that a bluish hue may be generated.

However, the color coordinate may be compensated by using the above polarizer. That is, if the liquid crystal composition of the present invention is not used and only the polarizer is used, the color coordinate is changed to $\Delta(x, y) = (4-5/1000, 4-66/1000)$ such that a yellowish hue may be generated, however the two color coordinates compensate each other such that the desired color coordinate may be obtained by using the liquid crystal layer made of the above liquid crystal composition and the polarizer according to the exemplary embodiments of the present invention.

In the above exemplary embodiment, the liquid crystal layer including the chemical formulae (I) to (X) is formed has been described, however the liquid crystal layer including the chemical formula (XI) to the chemical formula (XIV), the chemical formula (II), the chemical formula (V), and the chemical formula (VIII) may be used.

Next, a liquid crystal display according to another exemplary embodiment of the present invention will be described.

Figure 4:
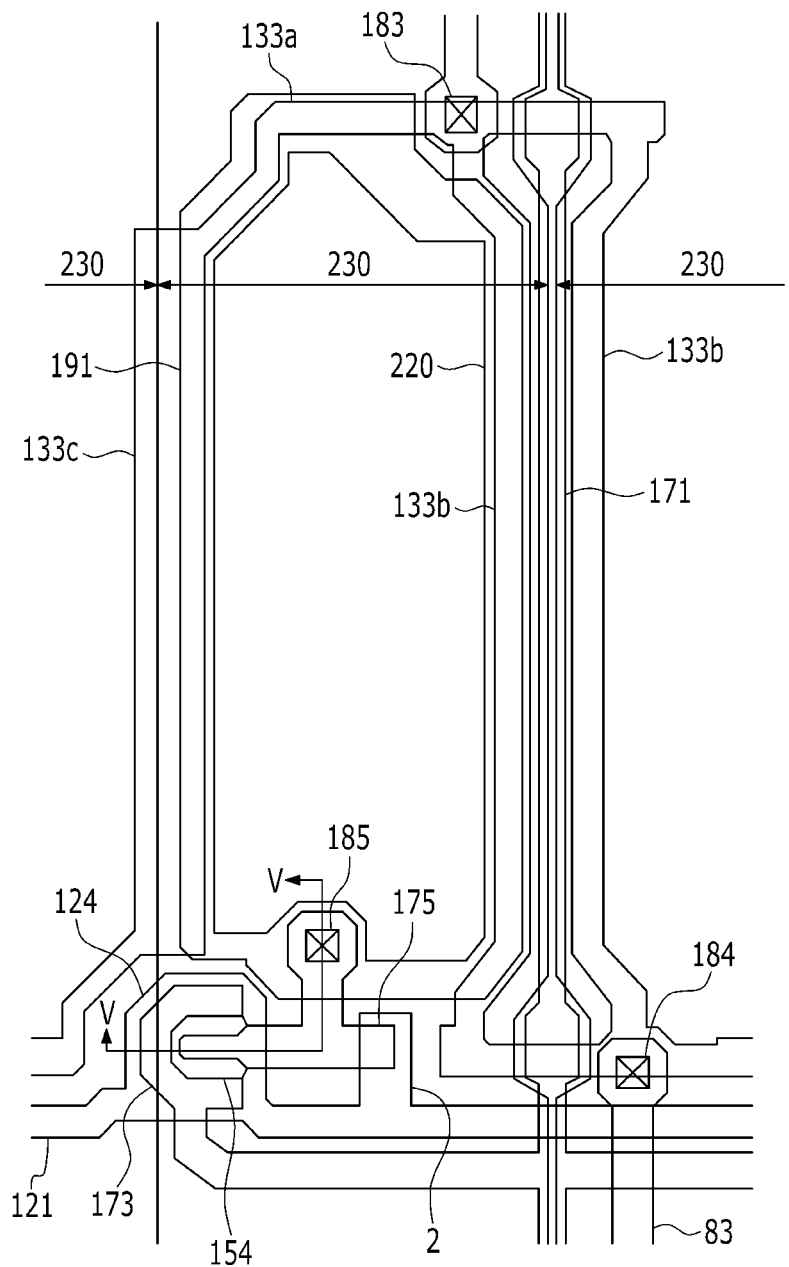
FIG. 4 is a layout view of a liquid crystal display according to another exemplary embodiment of the present invention.
Figure 5:
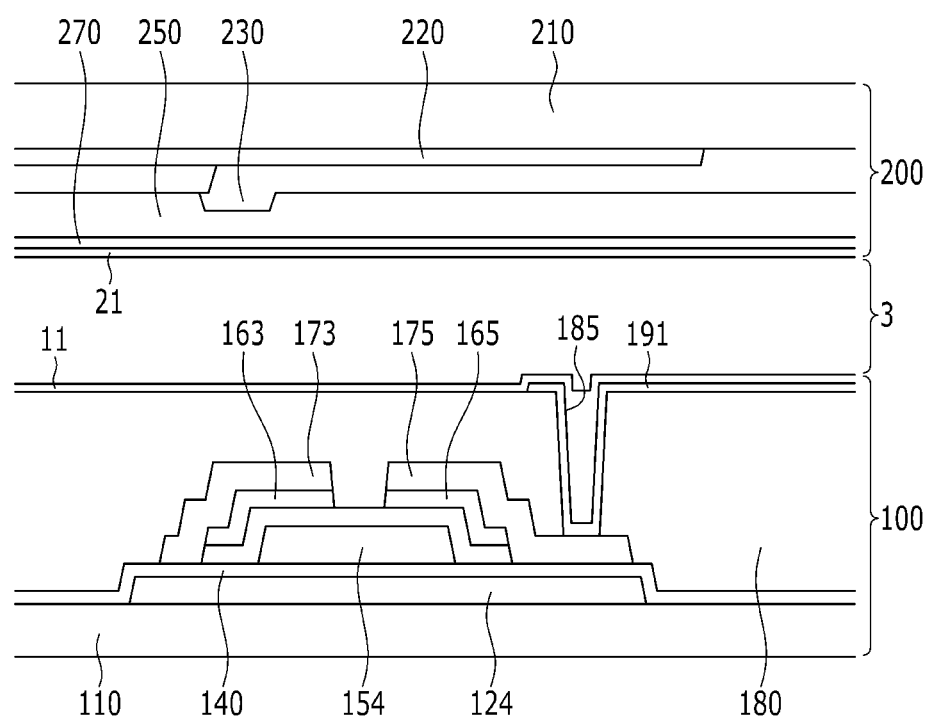
FIG. 5 is a cross-sectional view taken along line V-V of FIG. 4.
Figure 6:
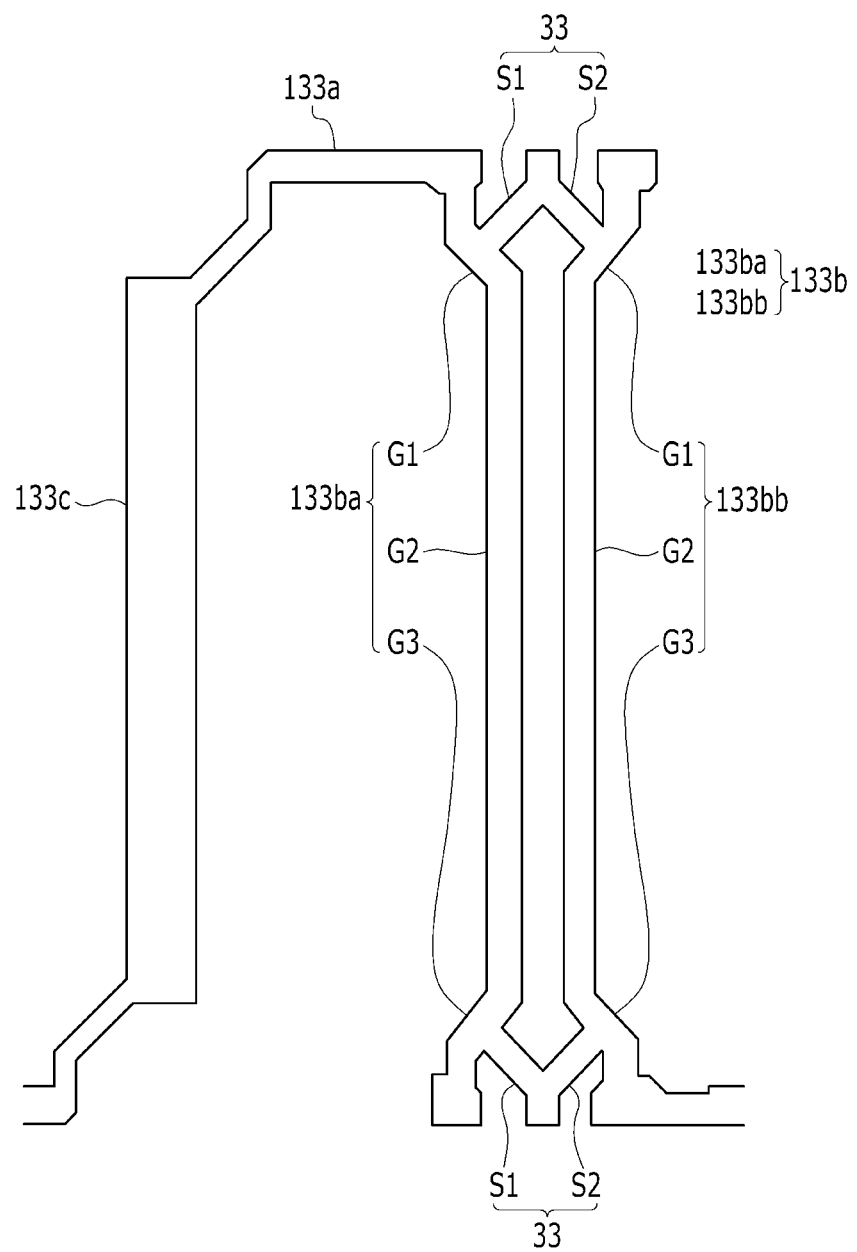
FIG. 6 is a layout view only showing the storage electrode line of FIG. 4.

FIG. 4 is a layout view of a liquid crystal display according to another exemplary embodiment of the present invention, FIG. 5 is a cross-sectional view taken along the line V-V of FIG. 4, and FIG. 6 is a layout view only showing an exemplary embodiment of the storage electrode line of FIG. 4.

Referring to FIG. 4 and FIG. 5, a liquid crystal display according to an exemplary embodiment of the present invention includes a thin film transistor array panel 100 and a common electrode panel 200 facing each other, and a liquid crystal layer 3 interposed therebetween.

Firstly, the thin film transistor array panel 100 will be described.

Referring to the thin film transistor array panel 100, a plurality of gate conductors including a gate line 121 and storage electrodes 133a, 133b, and 133c are formed on a transparent insulation substrate 110.

The gate line 121 extends substantially in a horizontal direction and transfers a gate signal. The gate line 121 includes the gate electrode 124 protruded from the gate line 121. The gate line 121 includes a protrusion 2 additionally protruded from the gate line 121. The protrusion 2 overlaps with the drain electrode that is described later, thereby forming storage capacitance.

The storage electrode includes the first storage electrode 133a, the second storage electrode 133b, the third storage electrode 133c, and a pair of connections 33 (FIG. 6).

The storage electrode is not indicated by an additional reference numeral, however for better understanding and ease of description, when the storage electrode includes the first storage electrode 133a, the second storage electrode 133b, the third storage electrode 133c, and the pair of connections 33, the storage electrodes 133a, 133b, 133c, and 33 including the reference numerals thereof may be referred to.

Referring to FIG. 4 and FIG. 6, if the storage electrode is described in detail, the first storage electrode 133a extends in the same direction as the gate line 121, and both ends of the first storage electrode 133a are respectively connected to one end of the second storage electrode 133b and the third storage electrode 133c.

The second storage electrode 133b is separated by a predetermined interval, and includes the left second storage electrode 133ba and the right second storage electrode 133bb connected by the first storage electrode 133a (FIG. 4) or a connection 33 (FIG. 6). The connection may include first straight connection S1 and second straight connection S2. The left second storage electrode 133ba and the right second storage electrode 133bb of the second storage electrode 133b respectively include a curved portion G1 and G3, and a straight portion G2.

Again, referring to FIG. 4 and FIG. 5, a gate insulating layer 140 is formed on the gate conductor.

A plurality of semiconductor stripes 151 made of amorphous silicon or polysilicon are formed on the gate insulating layer 140. The semiconductor stripes 151 are mainly extended in the longitudinal direction, and include a protrusion 154 extending toward the gate electrode 124 and are connected to each other.

A pair of ohmic contacts 163 and 165 are formed on the protrusion 154 of the semiconductor stripe.

The ohmic contacts 163 and 165 may be made of a material such as n+ hydrogenated amorphous silicon that is doped with an n-type impurity such as phosphorus at a high concentration, or of silicide.

A data conductor including a plurality of data lines 171 and a plurality of drain electrodes 175 is formed on the ohmic contacts 163 and 165 and the gate insulating layer 140.

The data line 171 transmits the data signal and extends in the longitudinal direction thereby crossing the gate line 121. Each data line 171 includes a source electrode 173 extending toward the gate electrode 124.

The drain electrode 175 extends in the transverse direction and includes a portion of a bar type facing the source electrode 173 and an expansion protruded from the bar portion.

The source electrode 173 is curved with a "⊂" shape or a "⊃" shape, and encloses one end of the bar portion of the drain electrode 175.

The gate electrode 124, the protrusion 154 of the semiconductor stripe, the source electrode 173, and the drain electrode 175 form a thin film transistor, and the channel of the thin film transistor is formed in the semiconductor 154 between the source electrode 173 and the drain electrode 175.

A passivation layer 180 made of the organic insulator is formed on the data conductor. The passivation layer 180 has a first contact hole 185 exposing the expansion of the drain electrode 175, a second contact hole 183 exposing one end of the second storage electrode 133b, and a third contact hole 184 exposing a second end of the second storage electrode 133b.

A plurality of pixel electrodes 191 and overpasses 83 that may be made of a transparent conductive material such as ITO or IZO, or a reflective metal such as aluminum, silver, chromium, or alloys thereof, are formed on the passivation layer 180.

The pixel electrode 191 is connected to the drain electrode 175 through the first contact hole 185, thereby receiving the data signal through the drain electrode 175.

The pixel electrodes 191 are formed with a quadrangular shape, and the longitudinal boundary line may be positioned on the second storage electrode 133b and the third storage electrode 133c formed in the longitudinal direction among the storage electrodes.

The overpasses 83 are laid across the gate line 121 and connected to the second storage electrodes 133b positioned in two pixel areas disposed on opposite sides of the gate lines 121 through the second contact hole 183 and the third contact hole 184.

An alignment layer 11 is formed on the pixel electrode 191, and the alignment layer 11 may be a horizontal alignment layer.

Next, the common electrode panel 200 will be described.

Referring to the common electrode panel 200, a light blocking member 220 is formed on a transparent insulation substrate 210. The light blocking member 220 that prevents light leakage is formed corresponding on the gate line 121, the data line 171, the thin film transistor, and the storage electrodes 133a, 133b, 133c, and 33.

Color filters 230 are formed on the light blocking member 220. The color filters 230 to realize the color of the liquid crystal display may be disposed by repeating three primary colors such as red, green, and blue. The color filters 230 may be elongated according to the data line 171. Alternatively, the color filters 230 may be formed in the thin film transistor array panel 100.

The color filters 230 may include a pigment and a dye, the pigment particle has a size of less than 50 nm, and the dye particles have a size (Å) of a molecular degree that may be directly dissolved in a solvent. The color filter including the minute pigments reduces the light loss due to scattering such that the transmittance is increased by 2% to 3% compared with a case that the minute pigments are not used.

An overcoat 250 made of an organic material to flatten the substrate is formed on the color filter 230.

The common electrode 270 is formed on the overcoat 250. The common electrode 270 may be formed with a transparent conductive material like the pixel electrode, and is formed on the whole surface of the substrate 210.

The common electrode 270 facing the pixel electrode 191 is applied with a predetermined voltage and generates an electric field to the liquid crystal layer 3 along with a voltage applied to the pixel electrode 191 such that the alignment of the liquid crystal molecules is determined to control the polarization of the incident light, thereby displaying images.

An alignment layer 21 is formed on the common electrode 270, and the alignment layer 21 may be the horizontal alignment layer.

Polarizers 12 and 22 are attached on respective outer surfaces of the two display panels 100 and 200 (see FIG. 2), and the transmissive axes of the two polarizers 12 and 22 may be perpendicular or parallel to each other. In the case of a reflective LCD, one of the two polarizers 12 and 22 can be omitted.

The polarizer may use a T-pol, and the T-pol may have transmittance more than 43.75% such that the transmittance of the liquid crystal display may be increased by a degree of about 3% to 4%.

The display panels 100 and 200 are fixed by a sealant (not shown), and a liquid crystal layer 3 including a plurality of liquid crystal molecules 31 is formed in a region defined by the sealant.

The liquid crystal layer 3 has positive dielectric anisotropy, and the liquid crystal molecules 31 of the liquid crystal layer 3 are arranged such that a longitudinal axes of the liquid crystal molecules 31 are approximately parallel to the surfaces of the two display panels 100 and 200 in the case that an electric field does not exist and are twisted from the lower panel 100 to the upper panel 200.

The liquid crystal layer 3 may include the above compound represented by the chemical formula (XI), the chemical formula (II), the chemical formula (XII), the chemical formula (XIII), and the chemical formula (XIV) at about 10 wt % to about 15 wt %, about 2 wt % to about 5 wt %, about 9 wt % to about 10 wt %, about 1 wt % to about 5 wt %, and about 17 wt % to about 20 wt % respectively, of the total amount of the liquid crystal composition. Also, the compound represented by the chemical formula (V) and the chemical formula (VIII) at about 32 wt % to about 43 wt % and about 15 wt % to about 20 wt % respectively, may be further included.

When the liquid crystal layer is formed with a liquid crystal composition according to an exemplary embodiment of the present invention, the refractive anisotropy ($\Delta n$) is formed at 0.135 to 0.145 compared with a conventional 0.1286. If the refractive anisotropy is increased, the retardation ($\Delta nd$) is increased under the equal cell gap. Here, the cell gap is about 3.1 μm to 3.3 μm.

When using the conventional liquid crystal composition, the retardation is 412 nm and the transmittance, referring to FIG. 3, is about 6.73%. However, when using the liquid crystal composition according to an exemplary embodiment of the present invention, $\Delta n$ is increased such that the retardation is increased to about 450 nm to 460 nm. Accordingly, referring to FIG. 3, it may be confirmed that the transmittance is increased by about 7.01%.

Here, the liquid crystal pitch of the liquid crystal layer 3 may be about 50 μm-80 μm, dielectric anisotropy ($\Delta \in$) may be about 12 to 13, and the rotational viscosity may be less than about 85 mPa·s.

Meanwhile, when forming the liquid crystal layer made of the liquid crystal composition according to an exemplary embodiment of the present invention, the transmittance is increased, however the color coordinate of the liquid crystal display is changed to $\Delta(x, y)=(-6/1000, -6/1000)$ such that a bluish hue may be generated.

However, the color coordinate may be compensated by using the above polarizer. That is, if the liquid crystal composition of the present invention is not used and only the polarizer is used, the color coordinate is changed to $\Delta(x, y)=(4-6/1000, 4-66/1000)$ such that a yellowish hue may be generated, however the two color coordinates compensate each other such that the desired color coordinate may be obtained by using the liquid crystal layer made of the above liquid crystal composition like the exemplary embodiment of the present invention.

In the liquid crystal display of FIG. 4 and FIG. 5, the liquid crystal layer includes the chemical formula (XI), the chemical formula (II), the chemical formula (XII), the chemical formula (XIII), and the chemical formula (XIV), however the liquid crystal layer may include the chemical formulae (I) through (X).

In a thin film transistor array panel according to another exemplary embodiment of the present invention, to reduce the number of data lines, the data signals of two pixels may be transmitted by using one data line.

This will be described with reference to FIG. 7 and FIG. 8.

Figure 7:
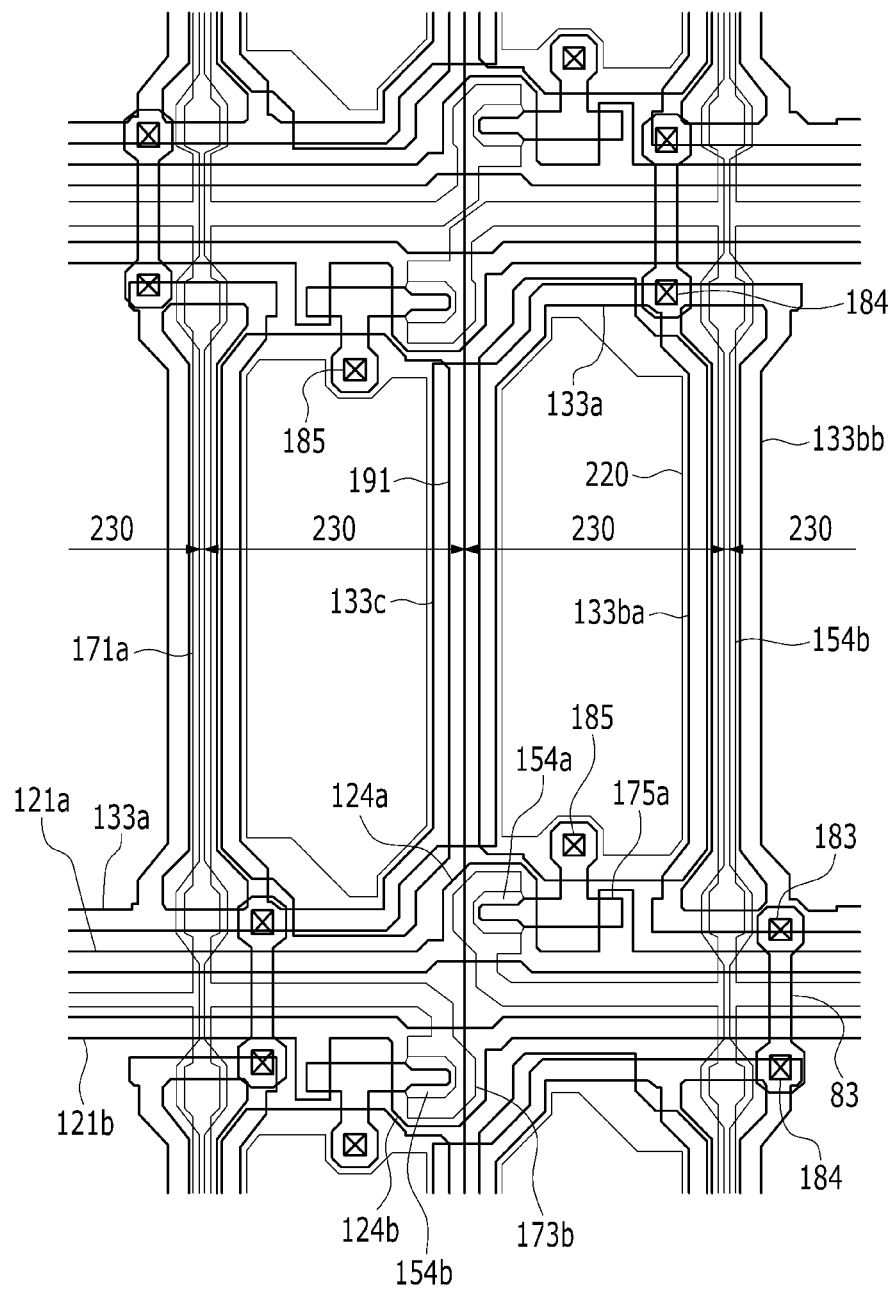
FIG. 7 and FIG. 8 are layout views of a thin film transistor array panel according to an exemplary embodiment of the present invention, and including the pixel of FIG. 4.
Figure 8:
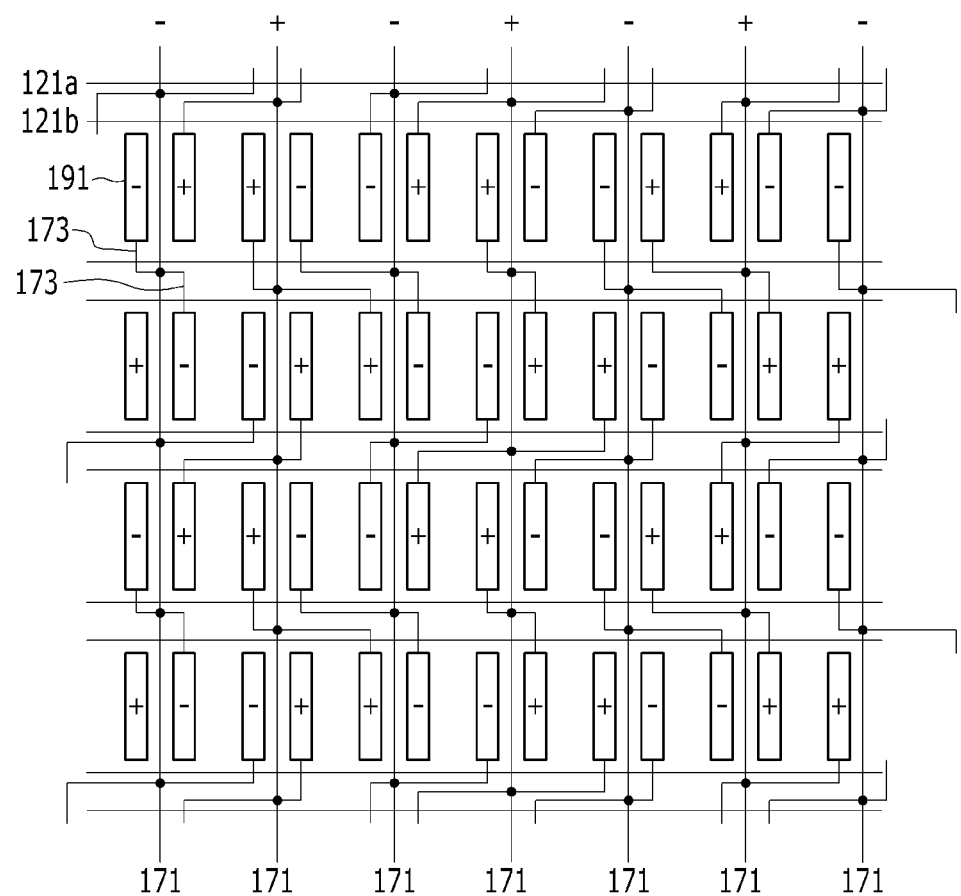

FIG. 7 and FIG. 8 are layout views of a thin film transistor array panel according to another exemplary embodiment of the present invention, and include the pixel of FIG. 5.

The same portions as those of FIG. 4 and FIG. 5 are indicated by the same reference numerals, and for better understanding and ease of description, letters such as a, b, and c are added to the reference numerals of FIG. 4 according to the description or the formation position.

As shown in FIG. 7, a first gate line 121a including a first gate electrode 124a protruded in an upper direction and a second gate line 121b having a second gate electrode 124b protruded in a lower direction are formed.

The first gate electrode 124a and the second gate electrode 124b are disposed on an extending line of the third storage electrode 133c.

To reduce the number of data lines, the data line 171 is formed one by one per two pixel areas and the source electrodes 173 are extended in opposite directions with respect to the data line 171.

The connection 33 (extension of first storage electrode 133a) transverses the data line 171 to connect the second left storage electrode 133ba and the second right storage electrode 133bb.

The third storage electrode 133c is positioned at the position bisecting the distance between two neighboring data lines 171, and overlaps the adjacent longitudinal edges of two neighboring pixel electrodes 191.

The first storage electrodes 133a are alternately disposed up and down for the pixel area whenever the column is changed, and are connected by the second storage electrode 133b or the third storage electrode 133c. Accordingly, the storage electrodes 133a, 133b, and 133c including the first storage electrode, the second storage electrode, and the third storage electrode form an approximately square wave.

On the other hand, the storage electrodes of two neighboring pixels are electrically connected by the first storage electrode 133a and the connection 33 in the horizontal direction, and the storage electrodes of two neighboring pixels are electrically connected by the connection 33 in the vertical direction. Accordingly, the storage electrodes 133a, 133b, and 133c of the entire substrate maintain a uniform storage voltage.

On the other hand, as shown in FIG. 8, if the pixel electrode and the thin film transistor are connected, 2-dot inversion driving may be realized. That is, two pixels positioned between two neighboring data lines represent the same polarities, and two pixels disposed at the opposite sides with respect to the data line represent the opposite polarities. Also, two pixels disposed at the opposite sides with respect to the first gate line 121a and the second gate line 121b represent the opposite polarities.

Here, the plane pattern or the connection relation of the pixel electrodes and the thin film transistors of two pixels disposed on both sides with respect to the data line may form inversion symmetry or mirror symmetry.

Accordingly, when forming the liquid crystal layer made of the liquid crystal composition including the compound according to an exemplary embodiment of the present invention, the transmittance of the liquid crystal display is increased.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A liquid crystal composition, comprising:
   a liquid crystal compound represented by chemical formula (I) at about 10 wt % to about 15 wt % of the total amount of the liquid crystal composition; and

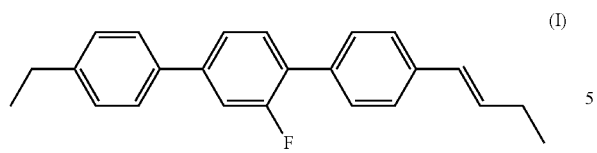
(I)

at least one liquid crystal compound selected from the group consisting of compounds represented by chemical formula (II), chemical formula (III), and chemical formula (IV), the total amount of the liquid crystal compounds being included at more than 0 wt % to about 20 wt % of the total amount of the liquid crystal composition:

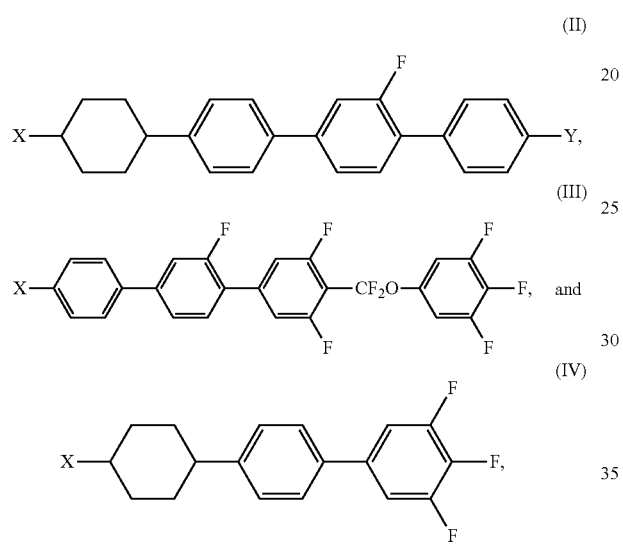

wherein X and Y are equal to each other or different from each other, and each of X and Y is an alkyl group or an alkenyl group having a carbon number of 1 to 4.

2. The liquid crystal composition of claim 1, wherein,
the amount of the liquid crystal compound represented by the chemical formula (II) is less than about 5 wt % of the total amount of the liquid crystal composition,
the amount of the compound represented by the chemical formula (III) is in a range of about 4 wt % to about 7 wt % of the total amount of the liquid crystal composition, and
the amount of the compound represented by the chemical formula (IV) is in a range of about 3 wt % to about 8 wt % of the total amount of the liquid crystal composition.

3. The liquid crystal composition of claim 2, further comprising at least one liquid crystal compound selected from the group consisting of compounds represented by chemical formula (V), chemical formula (VI), chemical formula (VII), chemical formula (VIII), chemical formula (IX), and chemical formula (X):

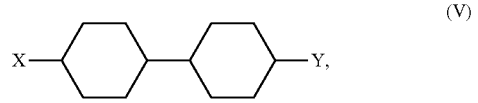
(V)

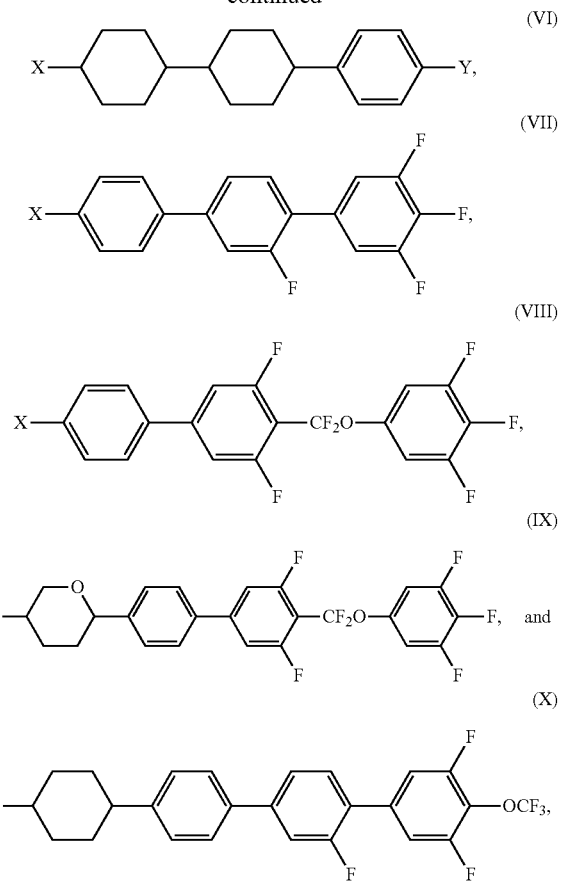

wherein X and Y are equal to each other or different from each other, and each of X and Y is an alkyl group or an alkenyl group having a carbon number of 1 to 4.

4. The liquid crystal composition of claim 3, wherein,
the amount of the compound represented by the chemical formula (V) is in a range of about 32 wt % to about 43 wt % of the total amount of the liquid crystal composition,
the amount of the compound represented by the chemical formula (VI) is in a range of about 2 wt % to about 13 wt % of the total amount of the liquid crystal composition,
the amount of the compound represented by the chemical formula (VII) is in a range of about 8 wt % to about 15 wt % of the total amount of the liquid crystal composition,
the amount of the compound represented by the chemical formula (VIII) is in a range of about 10 wt % to about 15 wt % of the total amount of the liquid crystal composition,
the amount of the compound represented by the chemical formula (IX) is in a range of about 5 wt % to about 15 wt % of the total amount of the liquid crystal composition, and
the amount of the compound represented by the chemical formula (X) is in a range of about 2 wt % to about 7 wt % of the total amount of the liquid crystal composition.

5. A liquid crystal display, comprising:
a first display panel;
a second display panel facing the first display panel; and
a liquid crystal layer disposed between the first display panel and the second display panel and comprising a liquid crystal composition, wherein the liquid crystal composition comprises:
a liquid crystal compound represented by chemical formula (I) at about 10 wt % to about 15 wt % of the total amount of the liquid crystal composition, and (I)
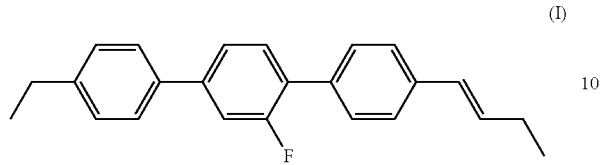

at least one liquid crystal compound selected from the group consisting of compounds represented by chemical formula (II), chemical formula (III), and chemical formula (IV), the total amount of the liquid crystal compounds being included at more than 0 wt % to about 20 wt % of the total amount of the liquid crystal composition:

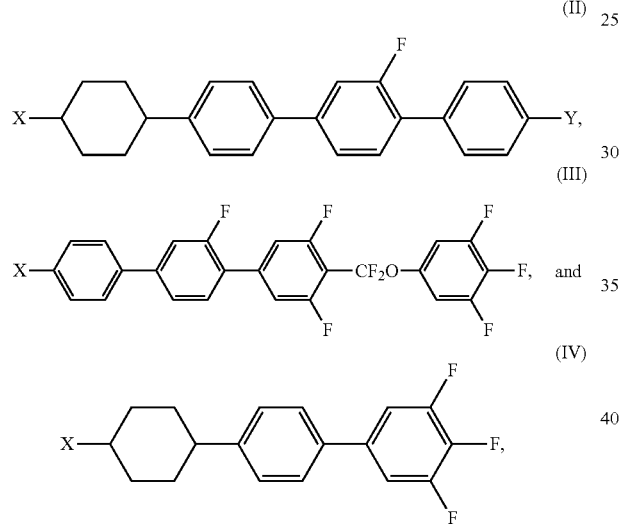

wherein X and Y are equal to each other or different from each other, and each of X and Y is an alkyl group or an alkenyl group having a carbon number of 1 to 4.

6. The liquid crystal display of claim 5, wherein,
the amount of the liquid crystal compound represented by the chemical formula (II) is less than about 5 wt % of the total amount of the liquid crystal composition,
the amount of the compound represented by the chemical formula (III) is in a range of about 4 wt % to about 7 wt % of the total amount of the liquid crystal composition, and
the amount of the compound represented by the chemical formula (IV) is in a range of about 3 wt % to about 8 wt % of the total amount of the liquid crystal composition.

7. The liquid crystal display of claim 5, further comprising at least one liquid crystal compound selected from the group consisting of compounds represented by chemical formula (V), chemical formula (VI), chemical formula (VII), chemical formula (VIII), chemical formula (IX) and chemical formula (X):

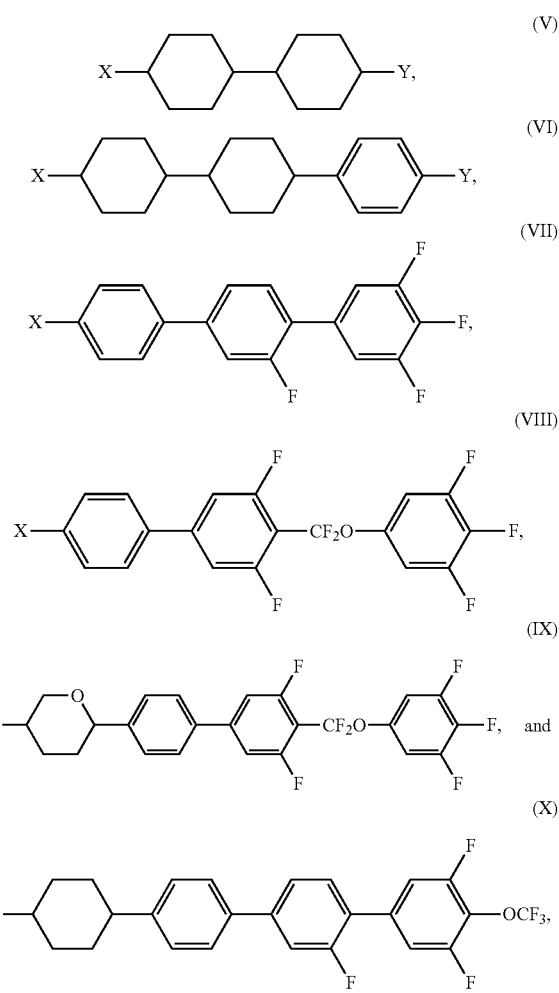

wherein X and Y are equal to each other or different from each other, and each X and Y is an alkyl group or an alkenyl group having a carbon number of 1 to 4.

8. The liquid crystal display of claim 7, wherein,
the amount of the compound represented by the chemical formula (V) is in a range of about 32 wt % to about 43 wt % of the total amount of the liquid crystal composition,
the amount of the compound represented by the chemical formula (VI) is in a range of about 2 wt % to about 13 wt % of the total amount of the liquid crystal composition,
the amount of the compound represented by the chemical formula (VII) is in a range of about 8 wt % to about 15 wt % of the total amount of the liquid crystal composition,
the amount of the compound represented by the chemical formula (VIII) is in a range of about 10 wt % to about 15 wt % of the total amount of the liquid crystal composition,
the amount of the compound represented by the chemical formula (IX) is in the range of about 5 wt % to about 15 wt % of the total amount of the liquid crystal composition, and
the amount of the compound represented by the chemical formula (X) is in the range of about 2 wt % to about 7 wt % of the total amount of the liquid crystal composition.

9. The liquid crystal display of claim 5, wherein retardation of the liquid crystal layer is in a range of about 450 nm to 460 nm.

10. The liquid crystal display of claim 9, wherein refractive anisotropy of the liquid crystal layer is in a range of about 0.135 to 0.145.

11. The liquid crystal display of claim 10, wherein a liquid crystal pitch of the liquid crystal layer is in a range of about 50 μm-80 μm, dielectric anisotropy (Δ∈) is in the range of about 12 to 13, and rotational viscosity is ≤85 mPa·s.

12. The liquid crystal display of claim 11, wherein a cell gap between two display panels is in a range of about 3.1 μm to 3.3 μm.

13. A liquid crystal composition comprising:
a liquid crystal compound represented by a chemical formula (XI) at about 10 wt % to about 15 wt % of the total amount of the liquid crystal composition:

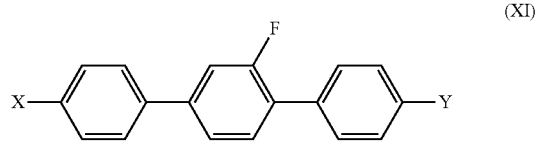
(XI)

a liquid crystal compound represented by a chemical formula (II) at about 2 wt % to about 5 wt % of the total amount of the liquid crystal composition:

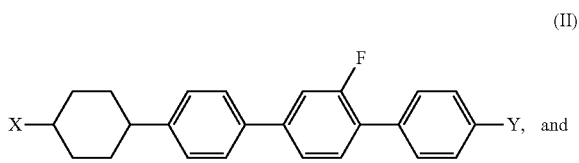
(II)

at least one liquid crystal compound selected from the group consisting of compounds represented by chemical formula (XII), chemical formula (XIII), and chemical formula (XIV), the total amount of the liquid crystal compounds being included at more than about 1 wt % to about 35 wt % of the total amount of the liquid crystal composition:

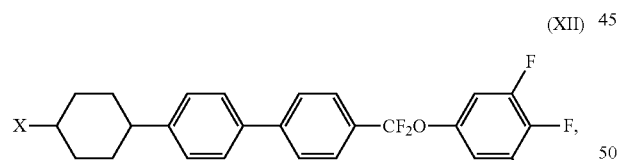
(XII)

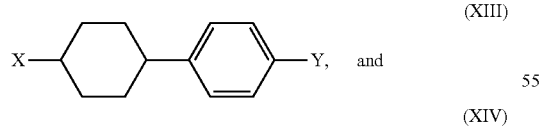
(XIII)

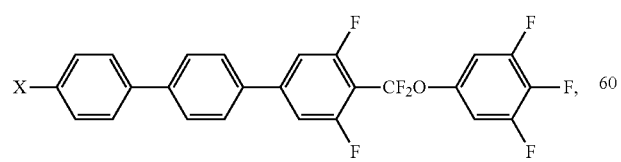
(XIV)

wherein X and Y are equal to each other or different from each other, and each of X and Y is an alkyl group or an alkenyl group having a carbon number of 1 to 4.

14. The liquid crystal composition of claim 13, wherein,
the amount of the liquid crystal compound represented by the chemical formula (II) is in a range of about 2 wt % to about 5 wt % of the total amount of the liquid crystal composition,
the amount of the liquid crystal compound represented by the chemical formula (XII) is in a range of about 9 wt % to about 10 wt % of the total amount of the liquid crystal composition,
the amount of the liquid crystal compound represented by the chemical formula (XIII) is in a range of about 10 wt % to about 5 wt % of the total amount of the liquid crystal composition, and
the amount of the liquid crystal compound represented by the chemical formula (XIV) is in a range of about 17 wt % to about 20 wt % of the total amount of the liquid crystal composition.

15. The liquid crystal composition of claim 14, further comprising at least one liquid crystal compound selected from the group consisting of compounds represented by chemical formula (V) and chemical formula (VIII):

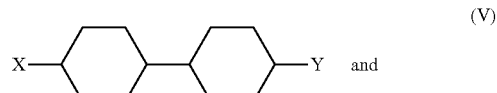
(V) and

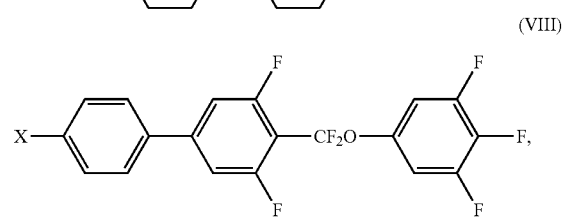
(VIII)

wherein X and Y are equal to each other or different from each other, and each of X and Y is an alkyl group or an alkenyl group having a carbon number of 1 to 4.

16. The liquid crystal composition of claim 15, wherein,
the liquid crystal compound represented by the chemical formula (V) is in a range of about 32 wt % to about 43 wt % of the total amount of the liquid crystal composition, and
the liquid crystal compound represented by the chemical formula (VIII) is in a range of about 15 wt % to about 20 wt % of the total amount of the liquid crystal composition.

17. A liquid crystal display, comprising:
a first display panel;
a second display panel facing the first display panel; and
a liquid crystal layer disposed between the first display panel and the second display panel,
wherein the liquid crystal layer comprises:
a liquid crystal compound represented by chemical formula (XI) at about 10 wt % to about 15 wt % of the total amount of the liquid crystal composition:

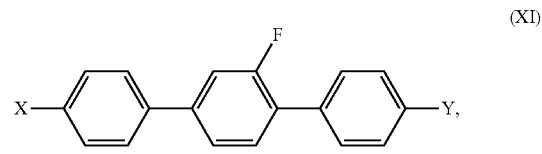
(XI)

a liquid crystal compound represented by a chemical formula (II) at about 2 wt % to about 5 wt % of the total amount of the liquid crystal composition:

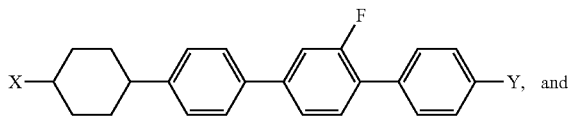

at least one liquid crystal compounds selected from the group consisting of compounds represented by chemical formula (XII), chemical formula (XIII), and chemical formula (XIV), the total amount of the liquid crystal compounds being included at more than about 1 wt % to about 35 wt % of the total amount of the liquid crystal composition:

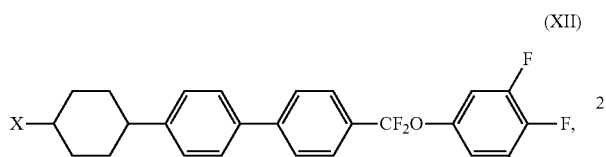

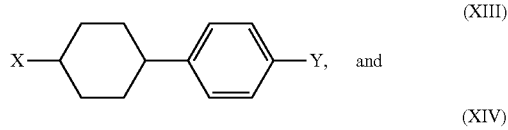

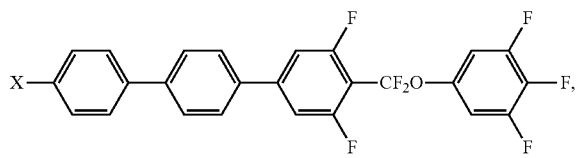

wherein X and Y are equal to each other or different from each other, and each of X and Y is an alkyl group or an alkenyl group having a carbon number of 1 to 4.

18. The liquid crystal display of claim 17, wherein,
the amount of the liquid crystal compound represented by the chemical formula (II) is in a range of about 2 wt % to about 5 wt % of the total amount of the liquid crystal composition,
the amount of the liquid crystal compound represented by the chemical formula (XII) is in a range of about 9 wt % to about 10 wt % of the total amount of the liquid crystal composition,
the amount of the liquid crystal compound represented by the chemical formula (XIII) is in a range of about 1 wt % to about 5 wt % of the total amount of the liquid crystal composition, and
the amount of the liquid crystal compound represented by the chemical formula (XIV) is in a range of about 17 wt % to about 20 wt % for the total amount of the liquid crystal composition.

19. The liquid crystal display of claim 18, further comprising at least one liquid crystal compound selected from the group consisting of compounds represented by chemical formula (V) and chemical formula (VIII):

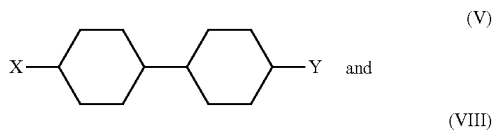

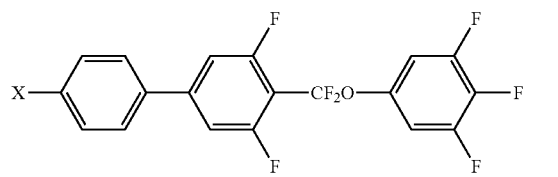

wherein X and Y are equal to each other or different from each other, and each X and Y is an alkyl group or an alkenyl group having a carbon number of 1 to 4.

20. The liquid crystal display of claim 19, wherein,
the amount of the liquid crystal compound represented by the chemical formula (V) is in a range of about 32 wt % to about 43 wt % of the total amount of the liquid crystal composition, and
the amount of the liquid crystal compound represented by the chemical formula (VIII) is in a range of about 15 wt % to about 20 wt % of the total amount of the liquid crystal composition.

21. The liquid crystal display of claim 17, wherein retardation of the liquid crystal layer is in a range of about 450 nm to 460 nm.

22. The liquid crystal display of claim 21, wherein refractive anisotropy of the liquid crystal layer is in a range of about 0.135 to 0.145.

23. The liquid crystal display of claim 22, wherein a liquid crystal pitch of the liquid crystal layer is in a range of about 50 μm-80 μm, dielectric anisotropy (Δ∈) is in a range of about 12 to 13, and rotational viscosity is ≤85 mPa·s.

24. The liquid crystal display of claim 23, wherein a cell gap between two display panels is in a range of 3.1 μm to 3.3 μm.

* * * * *